United States Patent

Nogawa

[11] Patent Number: 5,923,628
[45] Date of Patent: Jul. 13, 1999

[54] DISK ROTATIONAL VELOCITY CONTROLLING CIRCUIT

[75] Inventor: Hiromichi Nogawa, Yamagata, Japan

[73] Assignee: NEC Corporation, Tokyo, Japan

[21] Appl. No.: 08/921,085

[22] Filed: Aug. 29, 1997

[30] Foreign Application Priority Data

Aug. 29, 1996 [JP] Japan ................................. 8-229125

[51] Int. Cl.$^6$ ...................................................... G11B 7/00
[52] U.S. Cl. ............................................. 369/50; 369/48
[58] Field of Search ................................. 369/59, 60, 48, 369/47, 50, 124

[56] References Cited

U.S. PATENT DOCUMENTS

| | | | |
|---|---|---|---|
| 4,532,561 | 7/1985 | Kimura et al. | 360/73 |
| 5,233,589 | 8/1993 | Saito et al. | 369/48 |
| 5,235,590 | 8/1993 | Taguchi et al. | 369/124 |
| 5,519,683 | 5/1996 | Mizokami et al. | 369/59 |
| 5,523,991 | 6/1996 | Mizokami et al. | 369/48 |

FOREIGN PATENT DOCUMENTS 58-56258 4/1983 Japan .
59-172180 9/1984 Japan .
61-126665 6/1986 Japan .

*Primary Examiner*—Nabil Hindi
*Attorney, Agent, or Firm*—Foley & Lardner

[57] ABSTRACT

In a disk rotational velocity controlling circuit, an edge detection circuit 1 comprises a rising edge detector and a falling edge detector for detecting a rising edge and a falling edge of an EFM signal E, independently of each other. A synchronous pattern detection circuit 13 includes a first pattern width detector 2 for measuring an interval between each pair of continuous rising edge detection signals REG to compare each measured rising edge interval with a normal synchronous pattern width so as to generate first and second rotational signals RFF and RRW, a second pattern width detector 3 for measuring an interval between each pair of continuous falling edge detection signals FEG to compare each measured falling edge interval with the normal synchronous pattern width so as to generate third and fourth rotational signals FFF and FRW, and a detection result synthesis circuit 4 for synthesizing the first and third rotation signals RFF and FFF to generate a positive rotation signal FF and for synthesizing the second and fourth rotation signals RRW and FRW to generate a negative rotation signal RW.

7 Claims, 16 Drawing Sheets

DISK ROTATIONAL VELOCITY CONTROLLING CIRCUIT

BACKGROUND OF THE INVENTION

1. Field of the Invention

The present invention relates to a circuit for controlling a rotational velocity of a disk, and more specifically to a disk rotational velocity controlling circuit for controlling a rotational velocity of a disk such as a CD (compact disk), of a CLV (constant linear velocity) type.

2. Description of Related Art

Prior art disk rotational velocity controlling circuits of this type have been used to constitute a velocity controlling circuit in a signal reproducing apparatus for a recording medium such as a CD, in which information is recorded in a PCM (pulse code modulation) format, as a reproducing velocity controlling device disclosed in Japanese Patent Application Pre-examination Publication No. JP-A-61-126665, (an English abstract of JP-A-61-126665 is available from the Japanese Patent Office, and the content of the English abstract of JP-A61-126665 is incorporated by reference in its entirety into this application) (Prior Art Reference 1) or in Japanese Patent Application Pre-examination Publication No. JP-A-58-056258 or U.S. Pat. No. 4,532,561 claiming Conventional Priorities based on JP-A-58-056258 and three other Japanese patent applications, (the content of which is incorporated by reference in its entirety into this application) (Prior Art Reference 2).

Referring to FIG. 1, there is shown a block diagram of the first prior art disk rotational velocity controlling circuit. This shown first prior art disk rotational velocity controlling circuit comprises a disk 10 such as a CD in which digital information is recorded in an EFM (eight-to-fourteen Modulation) format and in the CLV type, a signal reproduction circuit 101 receiving an analog signal AR read out from the disk 10 by a pickup device (not shown), for converting the analog signal into a digital signal to generate an EFM signal E, a clock generator 8 for generating a clock CK, an edge detection circuit 102 receiving the EFM signal E and the clock CK for detecting an edge which is a level transition of the EFM signal, in synchronism with the clock CK, and for generating an edge detection signal EG, and a pattern width detection circuit 104 receiving the edge detection signal EG and the clock CK for calculating the width of the synchronous pattern from the edge detection signal EG and generating a disk rotation control signal CR.

Now, an operation of the prior art disk rotational velocity controlling circuit will be described with reference to FIG. 1. In order to elevate a recording density, the digital disk typified by the CD adopts the CLV type in which the linear velocity is maintained at constant regardless of which of an inner periphery and an outer periphery the signal is recorded in. Therefore, the rotational velocity of the disk must be changed in accordance with a reading position in a radial direction of the disk. For this purpose, a control is carried out to calculate a current linear velocity from a synchronous signal pulse included in the signal AR read out from the disk 10, and to maintain the linear velocity at a predetermined constant velocity.

In a CD modulation system, the frequency of the clock CK for giving the reference for the detection of the velocity is 4.3218 MHz, and therefore, a clock period T=1/4.3218 MHz. Information is recorded by patterns having the width (or duration) of three times to eleven times of the clock period T (namely, 3T to 11T). This information recording is performed in units of one frame which is composed of 588 bits, namely, 588T, and an information recording region or section is so configured that two or more maximum pattern widths of 11T never continue. On the other hand, a synchronous signal pattern for a frame synchronism (called a "synchronous pattern" hereinafter) is defined by a high level having a duration (namely, width) of 11T and a succeeding low level having a duration (namely, width) of 11T or a low level having a duration of 11T and a succeeding high level having a duration of 11T. Namely, the synchronous pattern is defined as two continuous maximum pattern widths (or durations), and is recorded at every 588T. Thus, it is possible to adjust the rotational velocity of the disk by detecting the two continuous maximum pattern widths as the synchronous pattern, and calculating a difference between the detected maximum pattern width and a maximum pattern width 11T corresponding to a normal rotation linear velocity. For example, if the detected maximum pattern width is larger than 11T, namely, if it is discriminated that the disk rotation linear velocity is slower than the normal rotation linear velocity, the control signal CR is generated to accelerate the disk rotational velocity. On the other hand, if the detected maximum pattern width is shorter than 11T. namely, if it is discriminated that the disk rotation linear velocity is faster than the normal rotation linear velocity, the control signal CR is generated to decelerate the disk rotational velocity. If the detected maximum pattern width is equal to 11T, namely, if it is discriminated that the disk rotation linear velocity is at the normal rotation linear velocity, the control signal CR is generated to maintain the disk rotational velocity as it is.

The signal reproduction circuit 101 converts the read-out signal AR into a digital signal to generate and output the EFM signal E to the edge detection circuit 102. The clock generator 8 generates the clock CK having the period T, and supplies the clock CK to the edge detection circuit 102 and the pattern width detection circuit 104. The edge detection circuit 102 detects the edge which is the level transition of the EFM signal E, in synchronism with the clock CK received, and generates and outputs the edge detection signal EG to the pattern width detection circuit 104. The pattern width detection circuit 104 responds to the edge detection signal EG, to detect the pattern width and to generate the disk rotation control signal CR for the disk acceleration, the disk deceleration or the disk velocity maintaining, on the basis of the difference between the detected pattern width and 11T.

Referring to FIG. 2, there is shown a circuit diagram of the edge detection circuit 102. This edge detection circuit 102 includes a buffer amplifier A201 receiving and amplifying the EFM signal E to generate an amplified signal EA, cascaded inverters I201 and I202 receiving the clock CK to generate a delayed clock CKD having a predetermined delay from the clock CK, a D-type flipflop F201 receiving the signal EA and controlled by the delayed clock CKD to output a signal ED1 which is delayed from the signal EA by one clock, another D-type flipflop F202 receiving the signal ED1 and controlled by the delayed clock CKD to output a signal ED2 which is delayed from the signal ED1 by one clock, and an exclusive OR gate EX201 receiving the signals ED1 and ED2 to generates an exclusive OR signal between the signals ED1 and ED2, as the edge detection signal.

Now, an operation of this edge detection circuit 102 will be described. If the EFM signal E is supplied to the buffer amplifier A201, the buffer amplifier A201 outputs the amplified EFM signal EA. The D-type flipflop F201 outputs, as the signal ED1, the signal EA after delaying the same by one clock and in synchronism with the delayed clock CKD. This signal ED1 is supplied to the D-type flipflop F202 and the exclusive OR gate EX201. The D-type flipflop F202 outputs, as the signal ED2, the signal ED1 after delaying the same by one clock and in synchronism with the delayed clock CKD. This signal ED2 is supplied to the exclusive OR gate EX201. The exclusive OR gate EX201 executes the exclusive OR logical operation between the signals ED1 and ED2, to detect the edge where the level of the EFM signal changes, and to generate the edge detection signal EG.

Referring to FIG. 3, there is shown a circuit diagram of the pattern width detection circuit 104. The shown pattern width detection circuit 104 includes a pattern width detector 41 receiving the edge detection signal EG and the clock CK to measure a time interval between each pair of continuous edge detection signals EG, by use of the clock CK, so as to determine the pattern width of the EFM signal E, and to generate a pattern width signal W, and a decoder 42 receiving the pattern width signal W to decode a difference between the received pattern width signal W and a predetermined pattern width, and to generate a disk deceleration signal RW or a disk acceleration signal FF.

Now, an operation of the pattern width detection circuit 104 will be described. The pattern width detector 41 measures the time interval between each pair of continuous edge detection signals EG, by counting the clock CK, and outputs the measured value W of the time interval to the decoder 42. Here, for calculation of the linear velocity of the disk rotation, a clock having the period T/N (where N is an integer) can be used in place of the clock CK. The decoder 42 calculates, from the measured value W, the pattern width corresponding to the measured value W, and also calculates a difference between the calculated pattern width and the predetermined pattern width which corresponds to a predetermined normal rotation linear velocity. If the difference is positive, since the rotational velocity is too high, the decoder 42 generates the disk deceleration signal RW. Alternatively, if the difference is negative, since the rotational velocity is too low, the decoder 42 generates the disk acceleration signal FF.

Here, consider a disk rotation starting time or a draw-in operation for example at the time of a track jump in which the position of a pickup is moved at random. If only the maximum pattern width of 11T in the read-out signal from the disk is measured as mentioned above, the precision for drawing to the predetermined rotation linear velocity becomes 1/11. In other words, the change rate of the disk linear velocity becomes 9.09%. This becomes a cause for lowering the access speed and the draw-in time in for example the track jump.

In order to improve the above mentioned disadvantage, there is a method for increasing the frequency of the disk rotation linear velocity detecting clock to N times, as mentioned above. In this case, however, an operation margin in the rotational velocity detection circuit becomes small for the reason explained hereinafter, and therefore, it becomes difficult to be applied to a four-time speed reproduction or an eight-time speed reproduction which are now widely used in CD-ROM (compact-disk read-only-memory) reproducing devices which are now being spread as a recording medium for a computer, and to a reproduction speed which is expected to be further elevated in future.

At present, the conventional reference clock frequency for CD is 4.3218 MHz (clock period T=1/4.3218 MHz) as mentioned hereinbefore. If N=2 is realized in order to double the detection precision, the detection clock frequency becomes 8.6436 MHz. In this device, if the reproduction speed is made to eight times, a required detection clock frequency becomes 69.1488 MHz, and therefore, a circuit design becomes difficult.

Referring to FIG. 4, there is shown a block diagram of a second prior art disk rotational velocity controlling circuit, which is JP-A-59-172180, (an English abstract of JP-A-59-172180 is available from the Japanese Patent Office, and the content of the English abstract of JP-A-59-172180 is incorporated by reference in its entirety into this application) (Prior Art Reference 3). As shown in FIG. 4, the second prior art disk rotational velocity controlling circuit is different from the first prior art disk rotational velocity controlling circuit, mainly in that, in place of the pattern width detection circuit 104, there is provided a shift register 206 receiving the edge detection signal EG and performing a shift operation in response to a clock CK for the velocity detection.

The number of stages in this shift register 206 is set to be larger than the number of reference clocks CK which should be generated in a synchronous signal generating period when the linear velocity of the recording track of the disk is normal, and the linear velocity is detected in accordance with the output content of the respective stages of the shift register 206. In this example, since the clock CK for the velocity detection is made to T/2, and since the pattern width of the synchronous signal to be detected is 11T×2=22T, the number of stages required in this shift register 206 at the normal velocity is 44 (=22T÷T/2). Therefore, by adding three stages as a detection toleration in the case that the disk rotation linear velocity is slower than the normal velocity, this shift register 206 is set to have 47 stages. In FIG. 4, 23 stages at a right side of a central position "X" in the shift register 206 are numbered "1" to "23" in order towards a right end stage, and 24 stages at a left side are numbered "-1" to "-24" in order towards a left end stage.

The edge detection signal EG has the pattern width of T/2. In the case of the normal velocity, the synchronous signal pattern width is 22T, and in the shift register 206, the stages having a non-inverted output of "1" include the stages "22", "-1" and "-23", and the other stages have an non-inverted output of "0". If the linear velocity elevates so that the synchronous signal pattern width becomes 21T, the shift register 206 changes to the effect that the stages "21", "-1" and "-22" have an non-inverted output of "1" and the other stages have an non-inverted output of "0". To the contrary, if the linear velocity lowers so that the synchronous signal pattern width becomes 23T, the shift register 206 changes to the effect that the stages "23", "-1" and "-24" have an non-inverted output of "1" and the other stages have an non-inverted output of "0".

The output content of the respective stages of the shift register 206 is detected by a combinational circuit composed of a combination of known AND circuits and OR circuits, and whether the linear velocity is slower or faster than the normal velocity, is detected on the basis of the result of the detection.

The second prior art disk rotational velocity controlling circuit as mentioned above, has a high detection precision, but becomes large in circuit scale. Namely, the synchronous signal pattern width of the read-out signal from the EFM recording disk is 22T (=11T×2) as mentioned above, and the minimum required stage number of the shift register storing the edge pattern in synchronism with the reference clock (T) becomes 22+α. Therefore, when the velocity detecting clock signal frequency is 2N as in this example, the minimum required stage number becomes 44+α. In addition, in order to detect all the contents of the stages of the shift register, the velocity detecting logic circuit becomes large in circuit scale.

In brief, since the first prior art disk rotational velocity controlling circuit as mentioned above uses only 11T which is a maximum pattern width value of the signal read out from the disk, the first prior art disk rotational velocity controlling circuit is disadvantageous in that the velocity detecting precision is low, and the access speed in the track jump or the like becomes low and the draw-in time becomes long.

In order to improve the just above mentioned problem, there is considered the method for elevating the frequency of the disk rotation linear velocity detecting clock to integer times of the reference clock frequency. However, this method reduces the operation margin of the disk rotational velocity detecting circuit. Furthermore, it is difficult to apply this method to the four-time speed reproduction or the eight-time speed reproduction which are now widely used in CD-ROM (compact-disk read-only-memory) reproducing which are now being spread as a recording medium for a compute, and to a reproduction speed which is expected to be further elevated in future.

On the other hand, since the second prior art disk rotational velocity controlling circuit as mentioned above is constructed to store the edge pattern in synchronism with the rotation linear velocity detecting clock, which is adapted to the synchronous signal pattern width 22T of the read-out signal from the EFM recording disk, the minimum required stage number of the shift register is large. In addition, the scale of the velocity detecting logic circuit for detecting all the contents of the stages of the shift register, becomes large, and therefore, the circuit scale becomes large.

SUMMARY OF THE INVENTION

Accordingly, it is an object of the present invention to provide a disk rotational velocity controlling circuit which has overcome the above mentioned defects of the conventional one.

Another object of the present invention is to provide a disk rotational velocity controlling circuit having an elevated detection precision of the rotational velocity and a small circuit scale.

The above and other objects of the present invention are achieved in accordance with the present invention by a disk rotational velocity controlling circuit for controlling a rotational velocity of a recording medium disk in which digital information in a predetermined signal format is recorded in a constant linear velocity type, and comprising a signal reproduction means receiving a read-out signal read out from said disk for converting said read-out signal into a reproduced signal of said predetermined signal format, characterized in that an edge detection circuit comprises a rising edge detecting means receiving said reproduced signal for detecting a rising edge of said reproduced signal to generate a rising edge detection signal, and a falling edge detecting means receiving said reproduced signal for detecting a falling edge of said reproduced signal, independently of said rising edge, to generate a falling edge detection signal, and a synchronous pattern detection circuit includes a first pattern width detector receiving said rising edge detection signal for measuring an interval between each pair of continuous rising edge detection signals to compare each measured rising edge interval with a normal synchronous pattern width so as to generate first and second rotational signals, a second pattern width detector receiving said falling edge detection signal for measuring an interval between each pair of continuous falling edge detection signals to compare each measured falling edge interval with said normal synchronous pattern width so as to generate third and fourth rotational signals, and a detection result synthesis circuit for synthesizing the first and third rotation signals to generate a positive rotation signal and for synthesizing the second and fourth rotation signals to generate a negative rotation signal.

The above and other objects, features and advantages of the present invention will be apparent from the following description of preferred embodiments of the invention with reference to the accompanying drawings.

Figure 8:
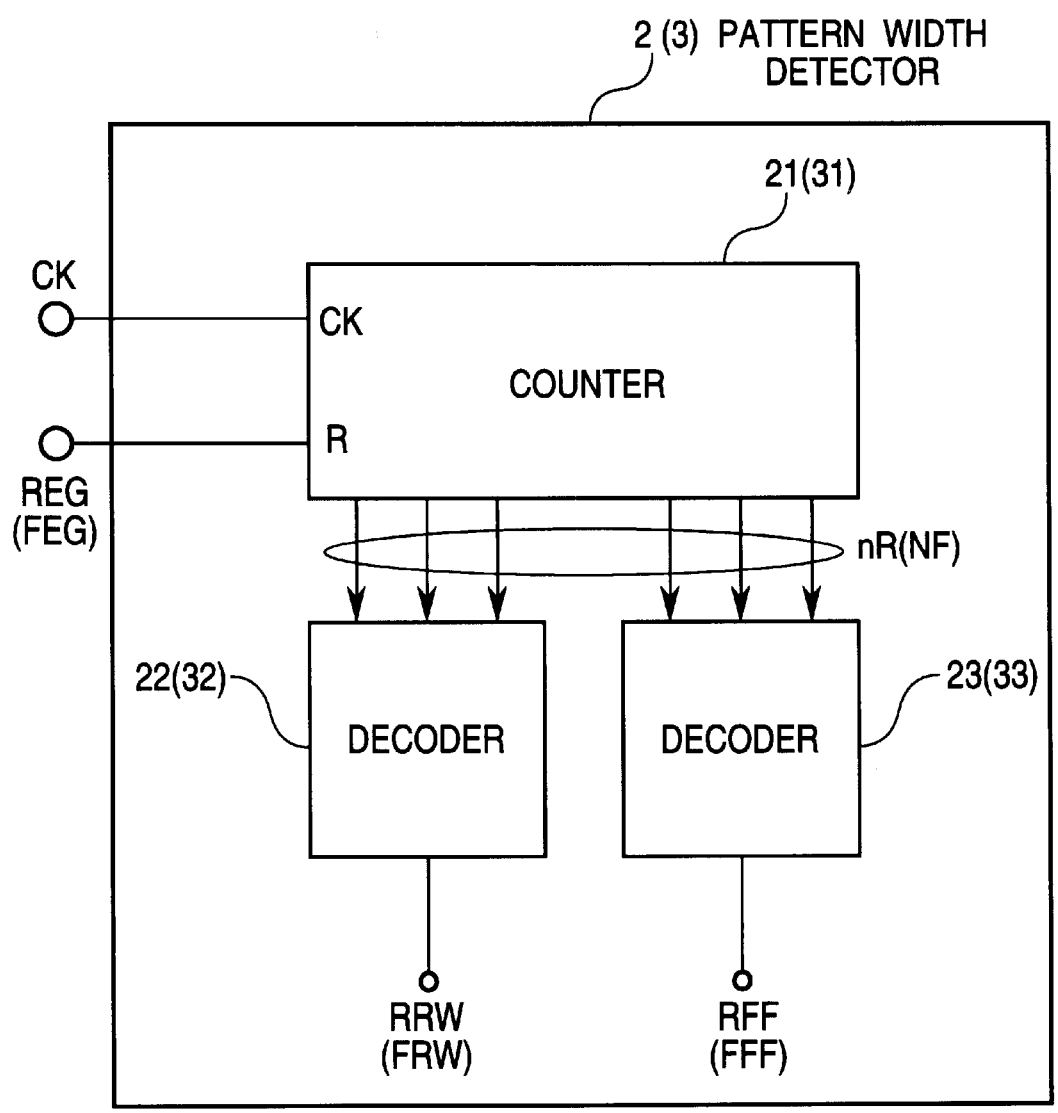
FIG. 8 is a circuit diagram of the pattern width detector used in the disk rotational velocity controlling circuit shown in FIG. 5.
Figure 10:
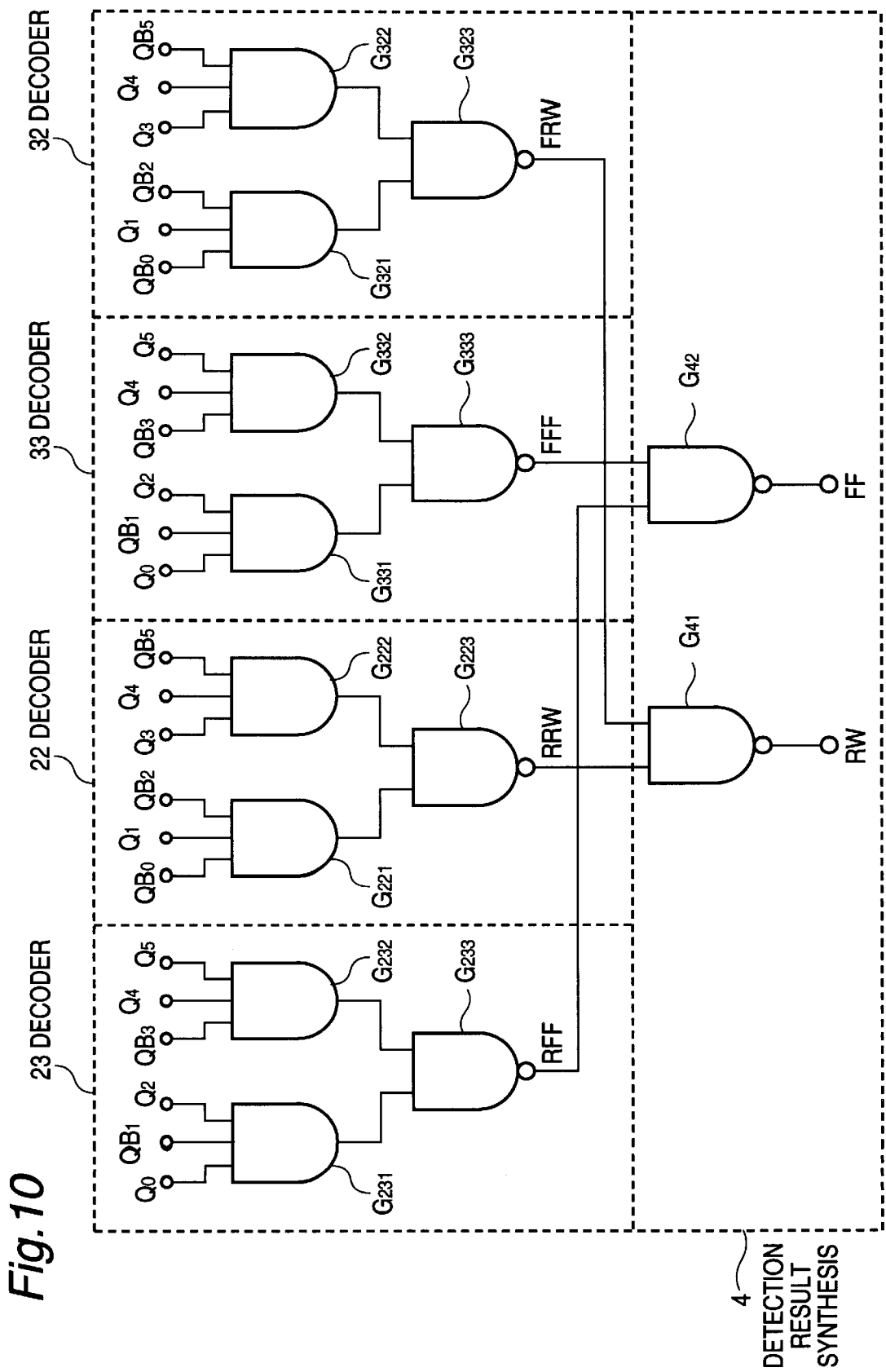
Figure 11:
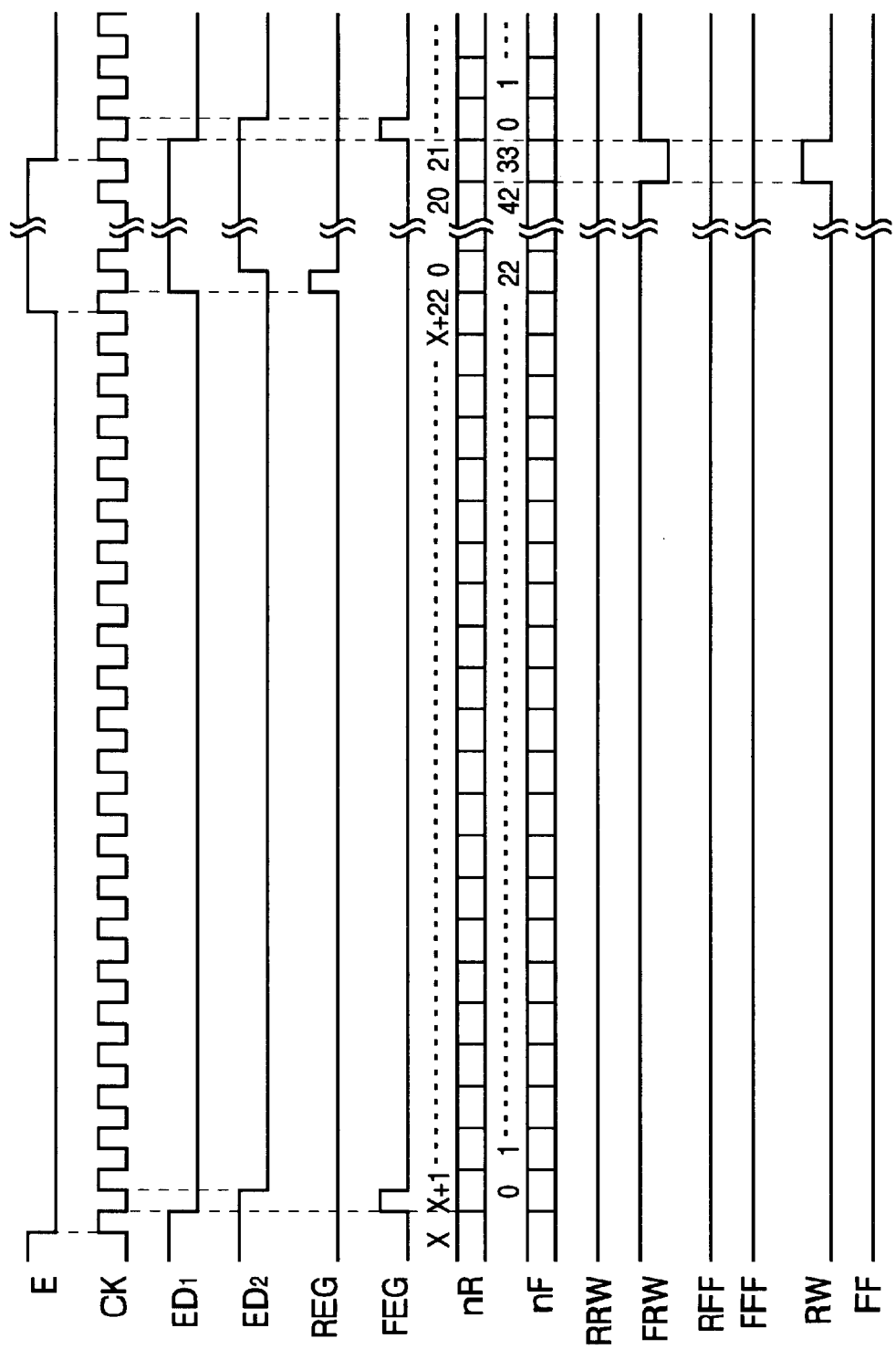
Figure 12:
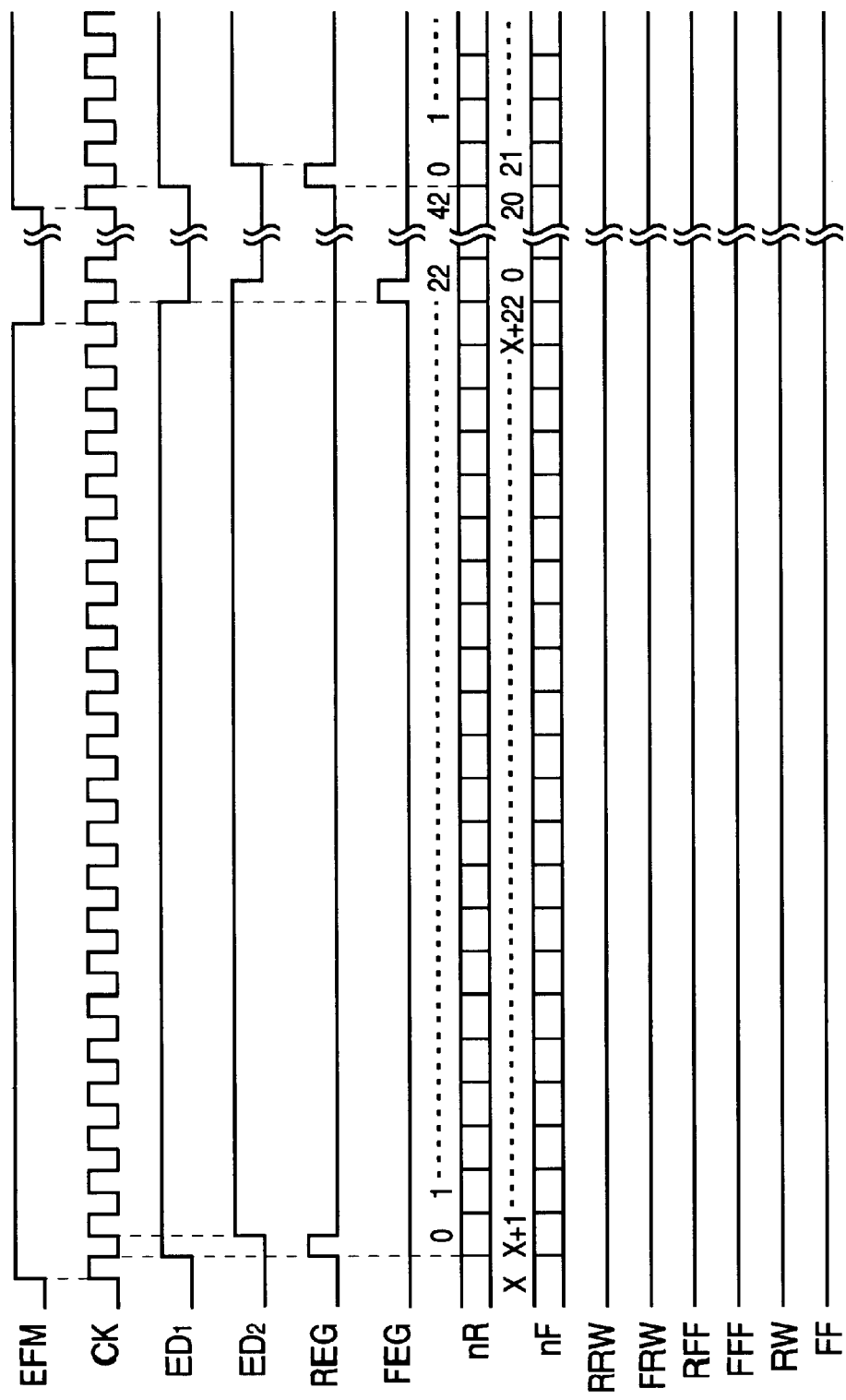
Figure 13:
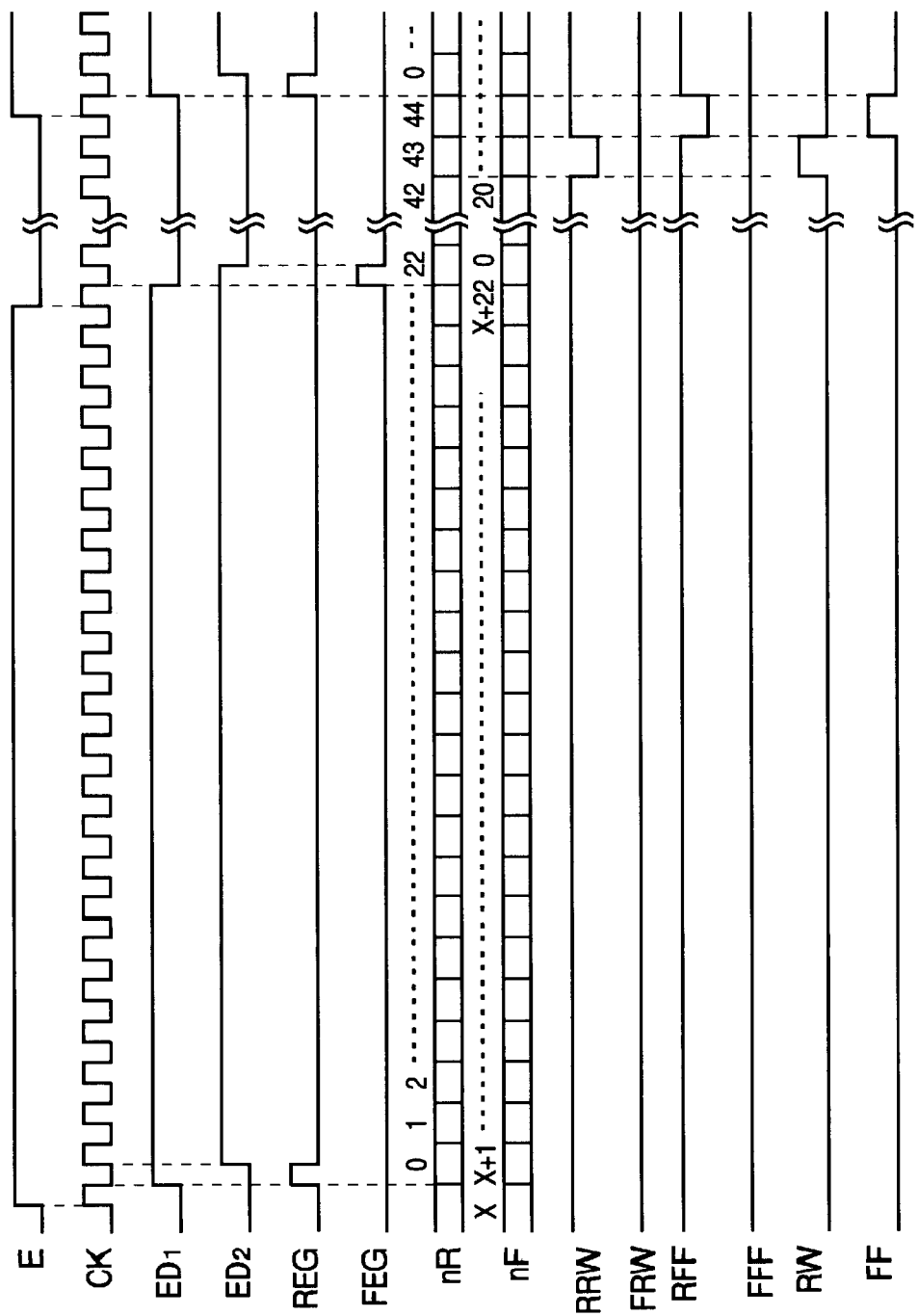
Figure 14:
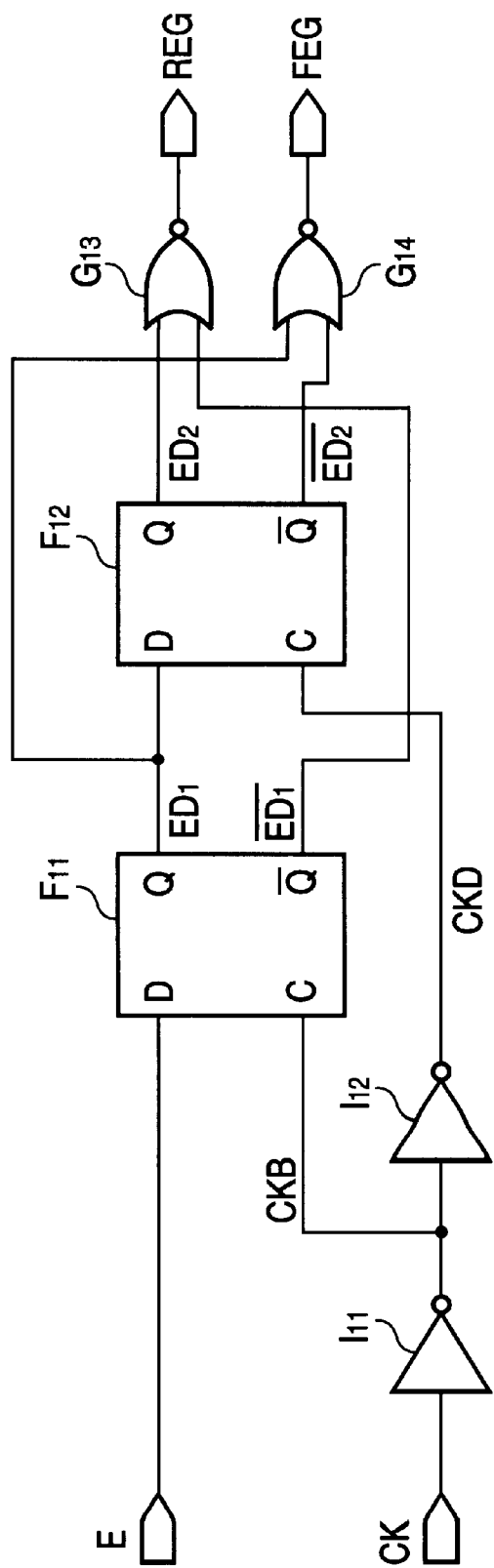
Figure 15:
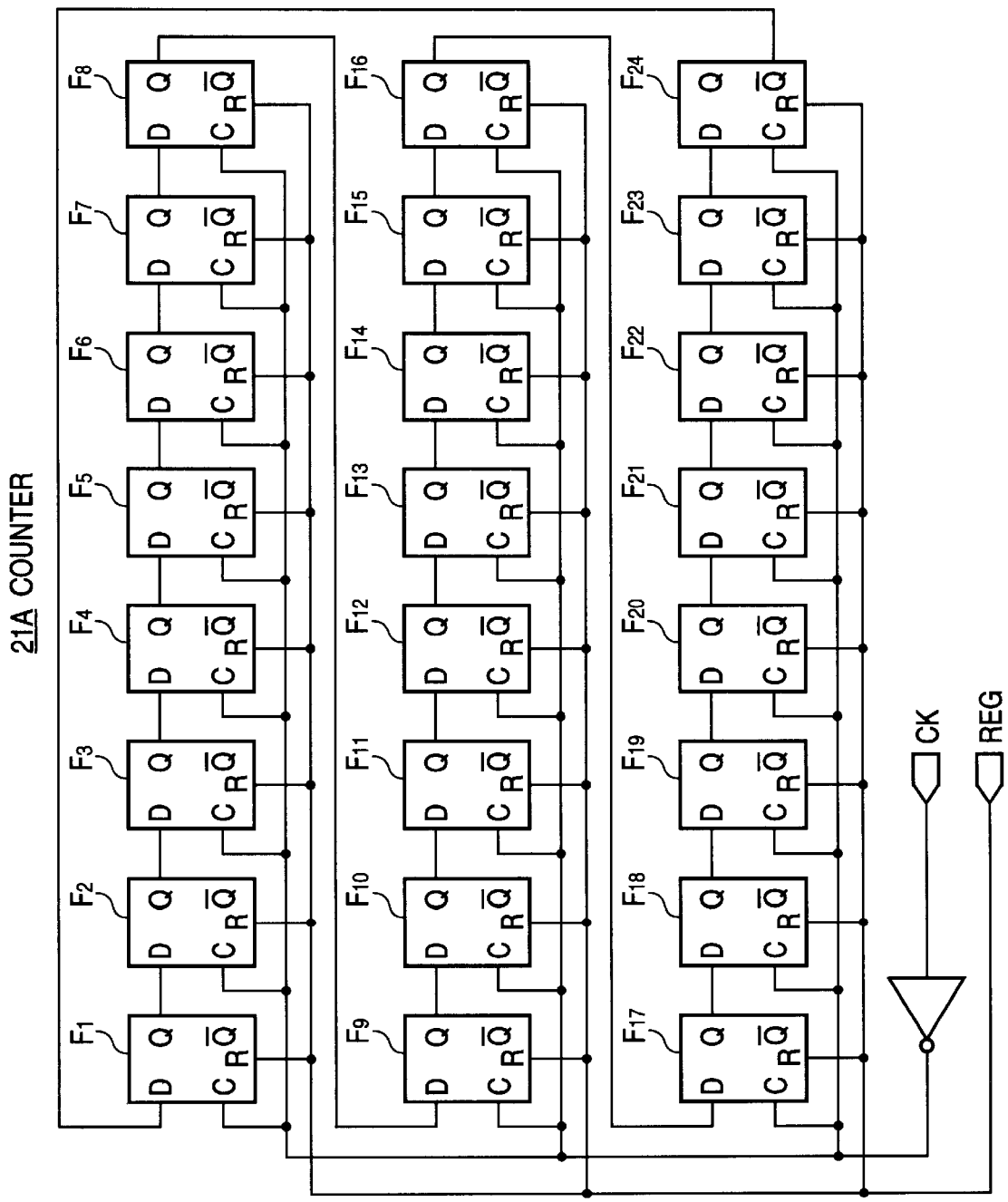
Figure 16:
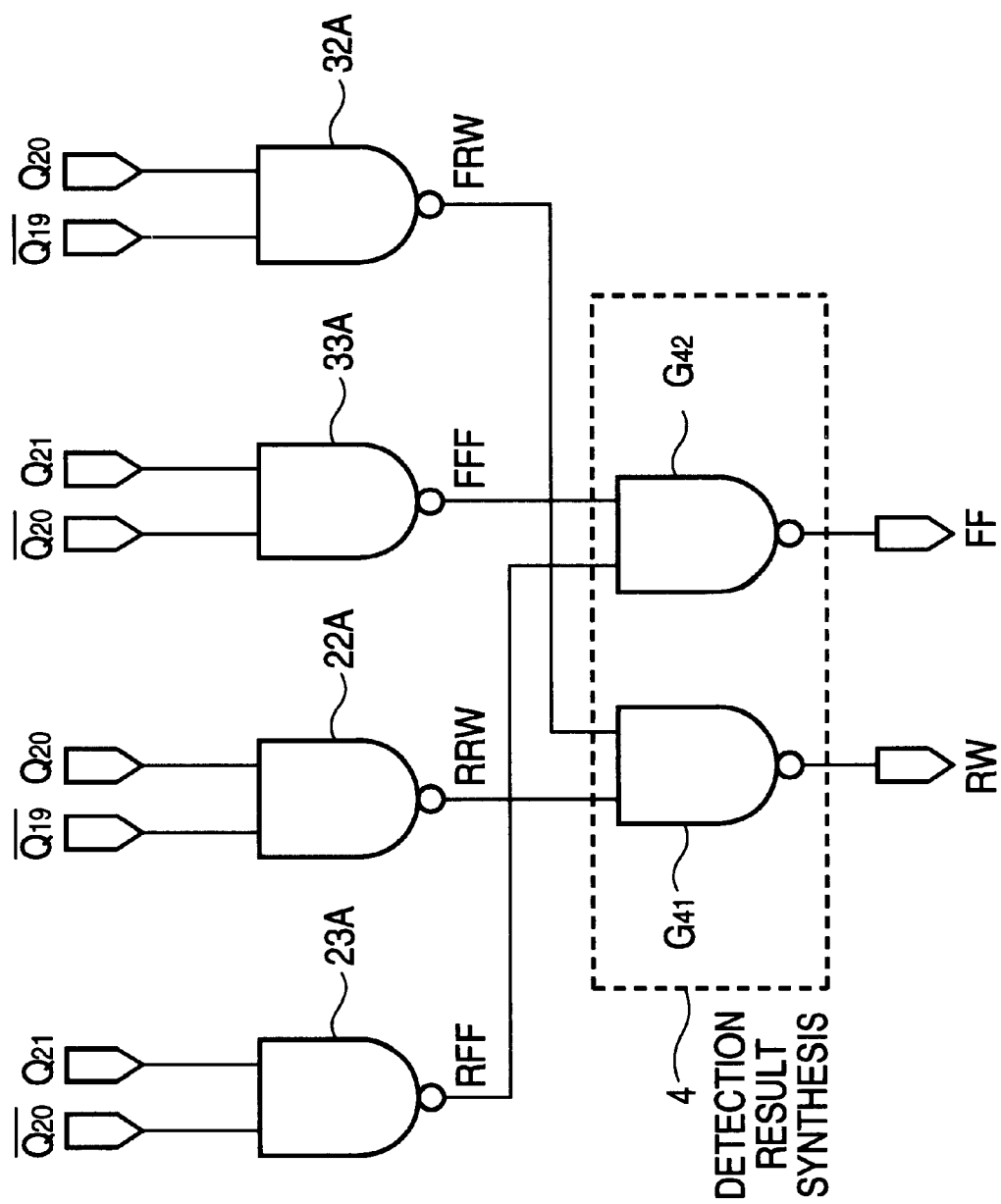
Figure 17:
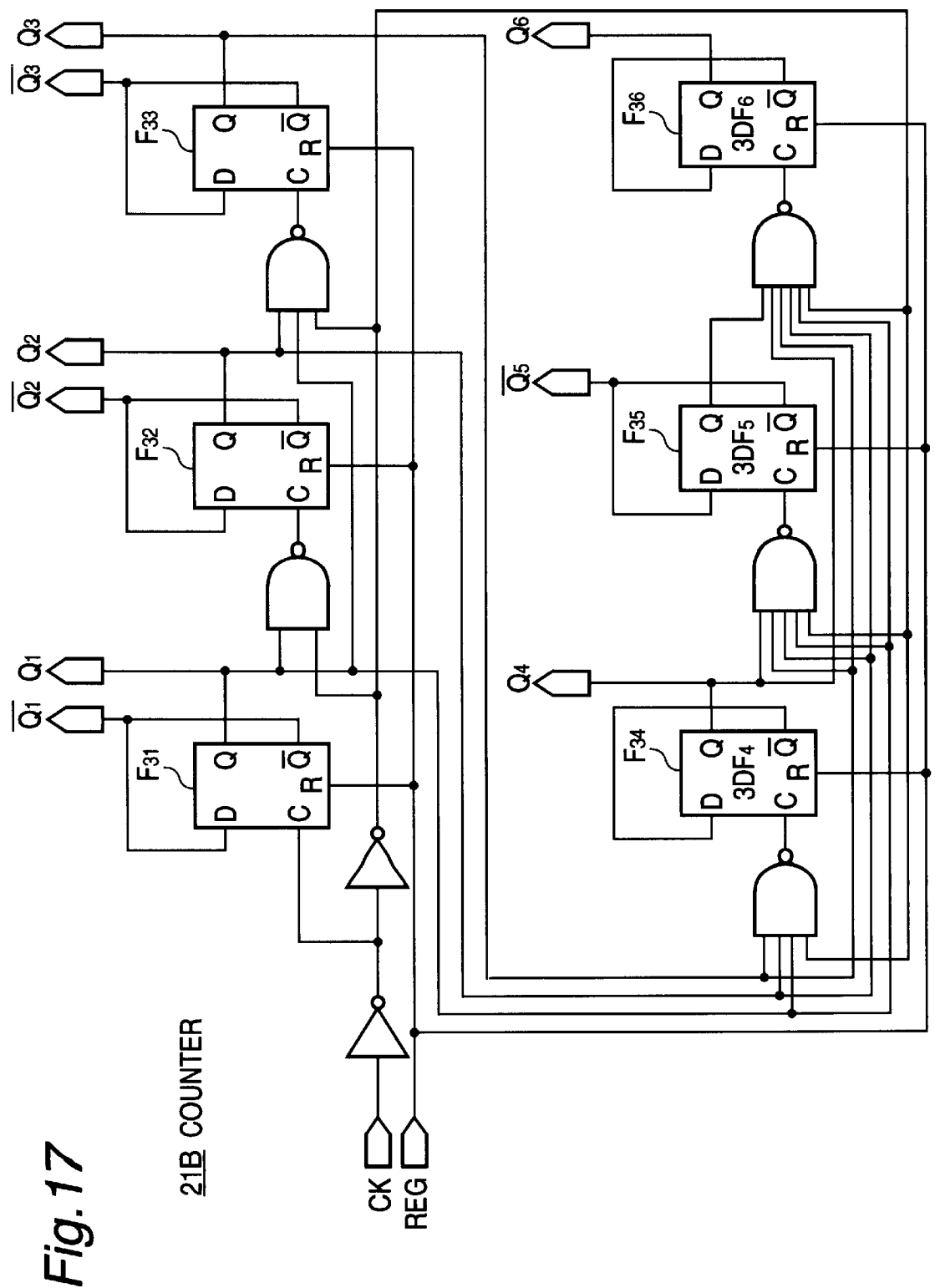
Figure 18:
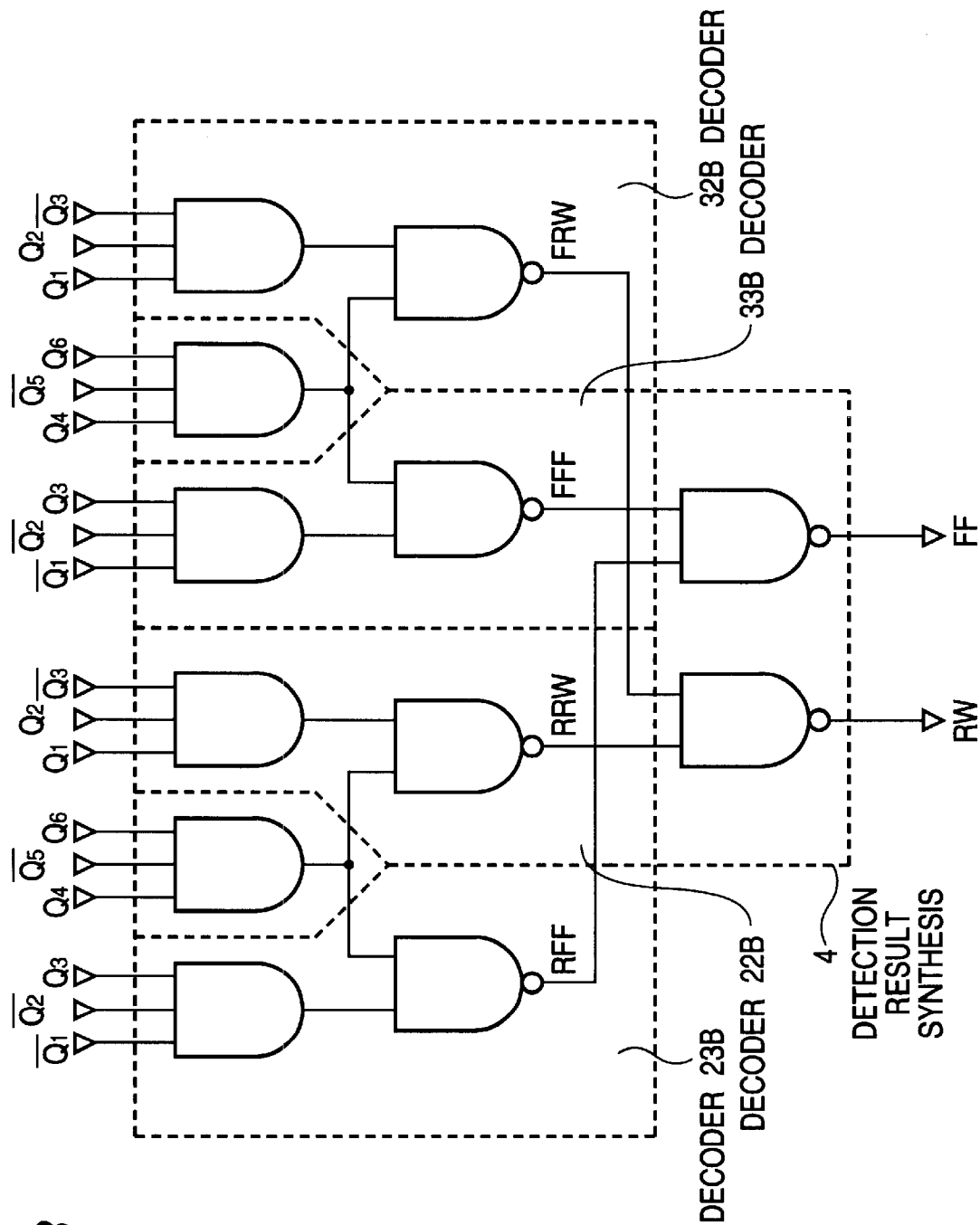

Pig. 9 is a circuit diagram of the counter used in the pattern width detector shown in FIG. 8;

FIG. 10 is a circuit diagram of the decoder used in the pattern width detector shown in FIG. 8;

FIG. 11 is a timing chart illustrating one example of the operation of the first embodiment of the disk rotational velocity controlling circuit in accordance with the present invention, at the time of a normal operation;

FIG. 12 is a timing chart illustrating one example of the operation of the first embodiment of the disk rotational velocity controlling circuit in accordance with the present invention, when the rotational velocity is faster than the normal rotational velocity;

FIG.13 is a timing chart illustrating one example of the operation of the first embodiment of the disk rotational velocity controlling circuit in accordance with the present invention, when the rotational velocity is slower than the normal rotational velocity;

FIG. 14 is a circuit diagram of the edge detection circuit used in a second embodiment of the disk rotational velocity controlling circuit in accordance with the present invention;

FIG. 15 is a circuit diagram of the counter used in a third embodiment of the disk rotational velocity controlling circuit in accordance with the present invention;

FIG. 16 is a circuit diagram of the decoder used in the third embodiment of the disk rotational velocity controlling circuit in accordance with the present invention;

FIG. 17 is a circuit diagram of the counter used in a fourth embodiment of the disk rotational velocity controlling circuit in accordance with the present invention; and FIG. 18 is a circuit diagram of the decoder used in the fourth embodiment of the disk rotational velocity controlling circuit in accordance with the present invention.

DESCRIPTION OF THE PREFERRED EMBODIMENTS

Figure 5:
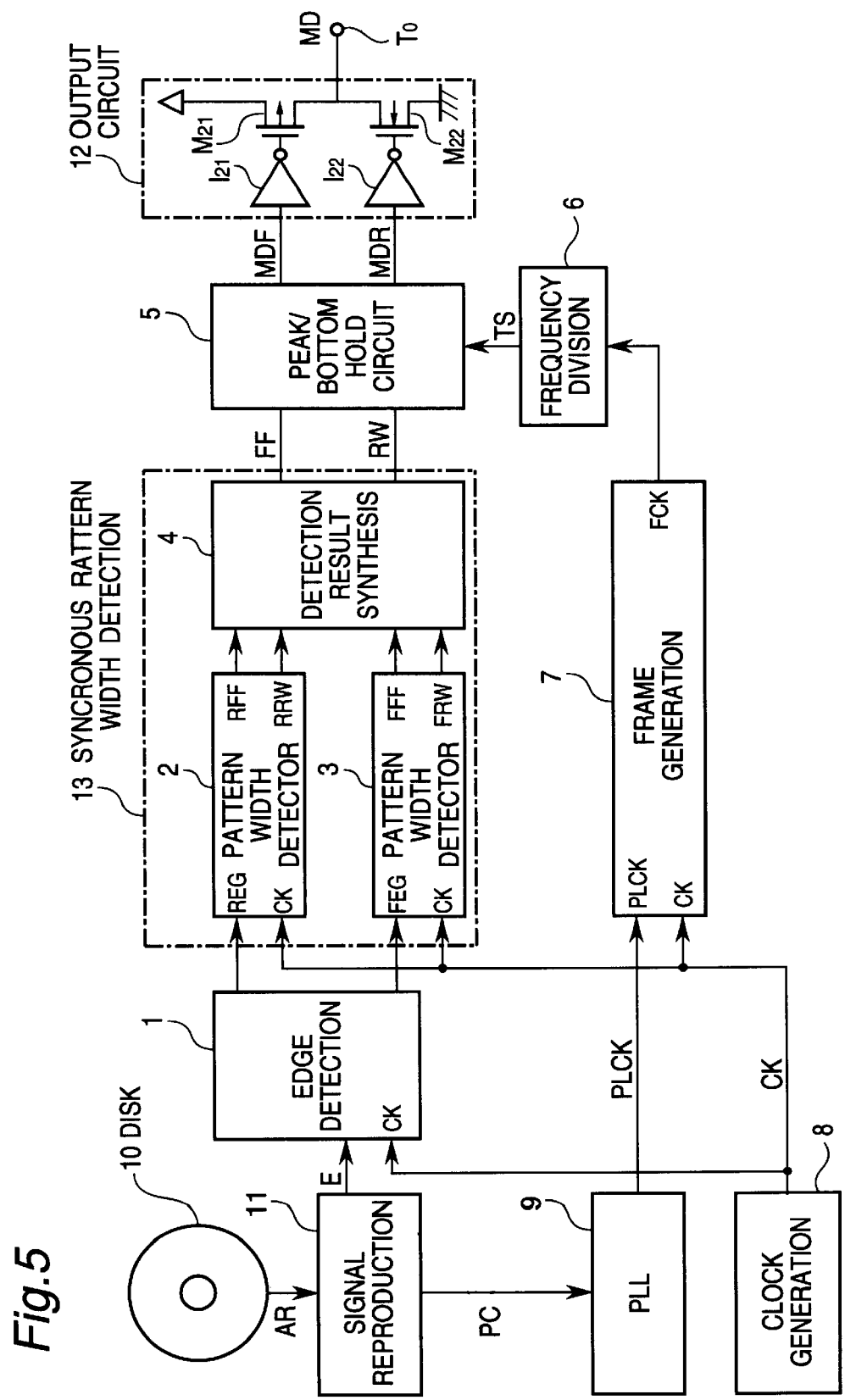
FIG. 5 is a block diagram of a first embodiment of the disk rotational velocity controlling circuit in accordance with the present invention.

Referring to FIG. 5, there is shown a block diagram of a first embodiment of the disk rotational velocity controlling circuit in accordance with the present invention. In FIG. 5, elements similar to those shown in FIG. 1 are given the same Reference Numerals and Signs.

Figure 1:
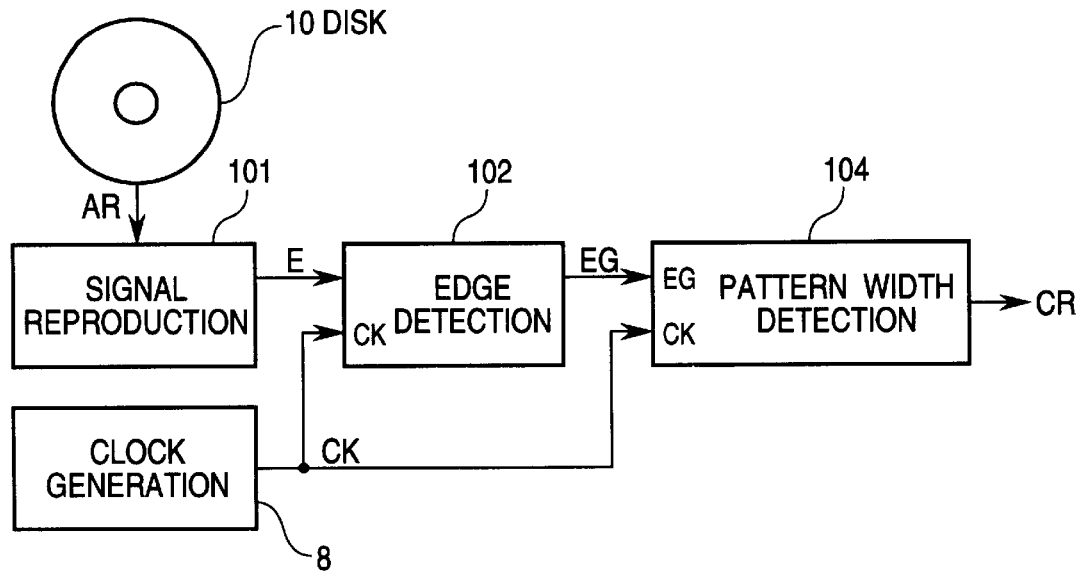
FIG. 1 is a block diagram of the first prior art disk rotational velocity controlling circuit.
Figure 2:
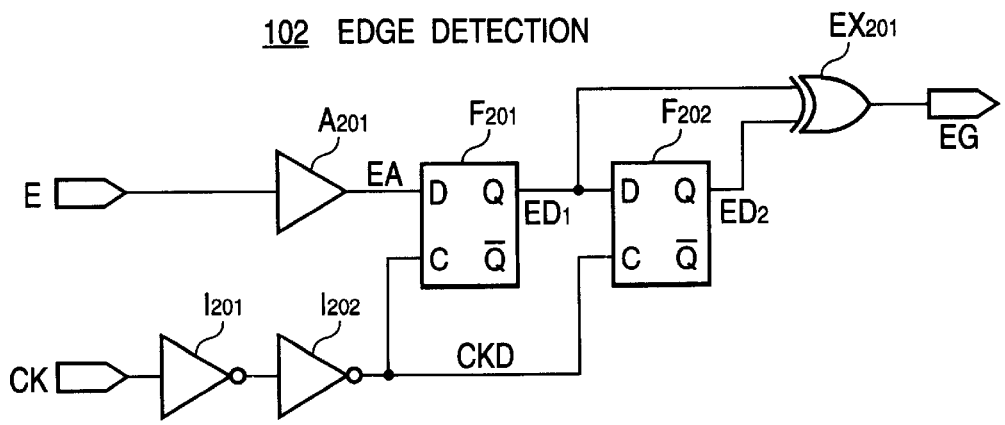
FIG. 2 is a circuit diagram of the edge detection circuit used in the first prior art disk rotational velocity controlling circuit shown in FIG. 1.
Figure 3:
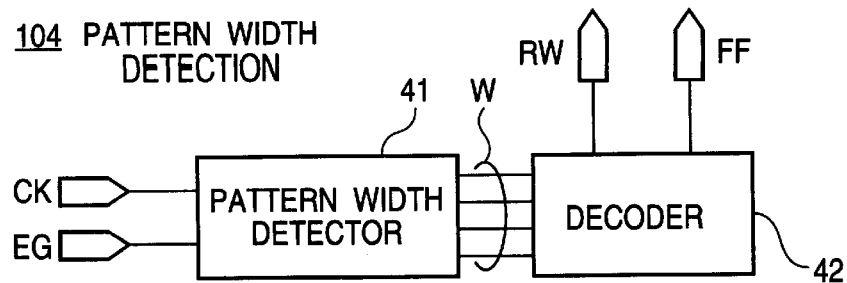
FIG. 3 is a circuit diagram of the pattern width detection circuit used in the first prior art disk rotational velocity controlling circuit shown in FIG. 1.
Figure 4:
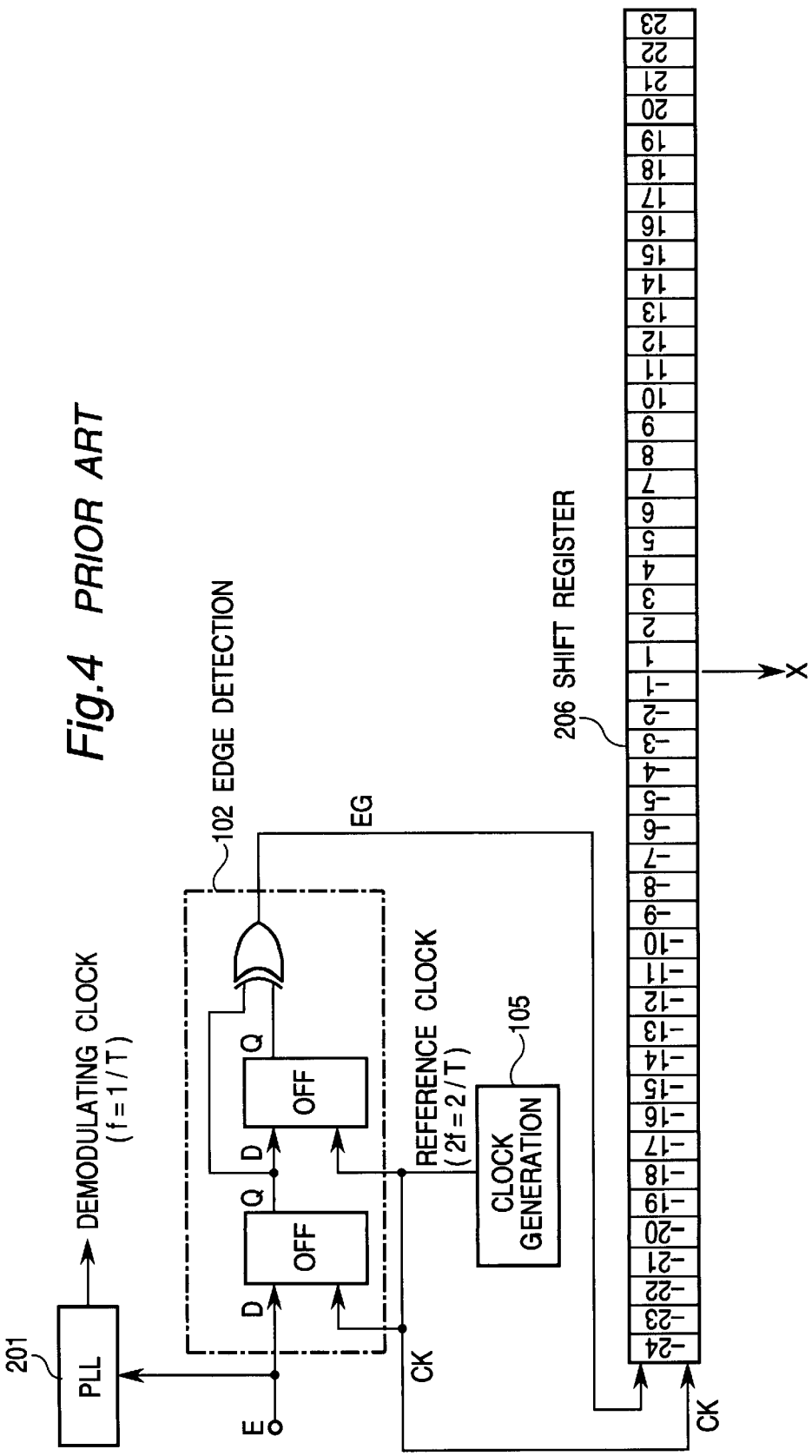
FIG. 4 is a block diagram of the second prior art disk rotational velocity controlling circuit.

The shown first embodiment of the disk rotational velocity controlling circuit comprises, in addition to the disk 10 and the clock generator 8 similar to those of the prior art circuit shown in FIG. 1, a signal reproduction circuit 11 receiving an analog read-out circuit AR read out from the disk 10, to convert into a digital signal so as to generate an EFM signal E, an edge detection circuit 1 receiving the EFM signal E and the clock CK to detect, in synchronism with the clock CK, an edge of the EFM signal E, which is a transition to a high level or a low level of the EFM signal E, and to generate a rising edge detection signal REG and a falling edge detection signal FEG, and a synchronous pattern width detection circuit 13 receiving the rising edge detection signal REG, the falling edge detection signal FEG and the clock CK, for measuring an interval between each two continuous rising edge detection signals REG and an interval between each two continuous falling edge detection signals FEG, and to compare respective maximum pattern widths with the synchronous pattern width 22T corresponding to the normal disk rotation linear velocity, so as to generate a positive rotation signal FF when the measured maximum pattern width is larger than 22T and a negative rotation signal RW when the measured maximum pattern width is smaller than 22T.

The shown first embodiment of the disk rotational velocity controlling circuit further comprises a peak/bottom hold circuit 5 for latching and holding the positive rotation signal FF and the negative rotation signal RW for a constant peak sampling period TS to output a corresponding positive motor drive signal MDF and a corresponding negative motor drive signal MDR, an output circuit 12 receiving the positive motor drive signal MDF and the negative motor drive signal MDR, for outputting a motor drive output signal MD, a PLL (phase lock loop) circuit 9 receiving a pit clock PC supplied from the signal reproduction 11 to self-lock in synchronism with the pit clock PC and to generate a pit clock signal PCLK corresponding to 1T, a frame generation circuit 7 receiving the pit clock signal PCLK and the clock signal CLK to generate a frame signal FCK, and a frequency-division circuit 6 receiving and dividing the frame signal FCK by a predetermined frequency dividing ratio N to generate the peak sampling period TS.

The synchronous pattern width detection circuit 13 includes a rising edge pattern width detector 2 for measuring the interval between each pair of continuous rising edge detection signals REG by counting the clock CK, and for comparing a maximum pattern width of the measured intervals, with the synchronous pattern width 22T corresponding to the normal rotation linear velocity, so as to generate a positive rotation signal RFF when the measured maximum pattern width is larger than 22T and a negative rotation signal RRW when the measured maximum pattern width is smaller than 22T, a falling edge pattern width detector 3 for measuring the interval between each pair of continuous falling edge detection signals FEG by counting the clock CK, and for comparing a maximum pattern width of the measured intervals, with the synchronous pattern width 22T corresponding to the normal rotation linear velocity, so as to generate a positive rotation signal FFF when the measured maximum pattern width is larger than 22T and a negative rotation signal FRW when the measured maximum pattern width is smaller than 22T, and a detection result synthesis circuit 4 for synthesizing he positive rotation signals RFF and FFF to generate the positive rotation signal FF and also synthesizing the negative rotation signals RRW and FRW to generate the positive rotation signal RW.

The output circuit 12 includes inverters I21 and I22 receiving the positive motor drive signal MDF and the negative motor drive signal MDR, respectively, a P-channel MOS transistor M21 having a source connected to a positive power supply voltage, a gate connected to an output of the inverter I21 so as to receive an inverted signal of the positive motor drive signal MDF, and an N-channel MOS transistor M22 having a drain connected to a drain of the P-channel MOS transistor M21 and an output terminal TO, a source connected to a ground potential, and a gate connected to an output of the inverter I22 so as to receive an inverted signal of the negative motor drive signal MDR.

Now, an operation of the shown embodiment will be described with reference to FIG. 5. In the following description, for convenience of description, it is assumed that the period of the clock CK for the rotation linear velocity detection is set to be a half of the period of the pit clock PC, namely, (½)T.

Firstly, similarly to the prior art example, the control is executed to maintain a predetermined linear velocity by calculating the current rotation linear velocity on the basis of the synchronous pattern which is included in the read-out signal AR read out from the disk 10 (in which digital information is recorded in the EFM format and in the CLV type) and which has the width {11T+11T} obtained by multiplying the width T of the pit clock included in the read-out signal AR, by {11+11}. For this purpose, a timing signal, namely, the synchronous pattern, is extracted from the EFM signal outputted from the signal reproduction circuit 11, and the linear velocity of the disk 10 is controlled to be maintained at a constant by using the synchronous pattern. This synchronous pattern can detected when the linear velocity is in a predetermined range of variation. In other words, when the variation of the linear velocity is in a capture range of the PLL circuit 9, it is possible to precisely control the rotation by means of the synchronous pattern. However, when the variation of the linear velocity is out of the capture range of the PLL circuit 9, for example, at the time of starting the disk rotation, or at a random access or a track jump, in which the position of the pickup device is moved at random, it becomes impossible to detect the synchronous pattern so that the rotation control becomes impossible.

In order to overcome this problem, the shown embodiment utilizes the fact that when an interval of the inversion of the signal (namely, a period from a rising edge to a falling edge, or a period from a falling edge to a rising edge) is maximum, the signal having the maximum inversion interval is the synchronous pattern. In other words, the edge detection circuit 1 of the shown embodiment detects the edge, namely, level transition of the EFM signal which is the maximum inversion interval signal, similarly to the prior art example. However, the edge detection circuit 1 of the shown embodiment further detects the rising edge and the falling edge, separately from each other, and the detected rising edge and the detected falling edge are supplied to the two pattern width detectors 2 and 3, respectively, so that the maximum rising edge interval of the pattern width 22T and the maximum falling edge interval of the pattern width 22T are detected.

The signal reproduction circuit 11 converts the read-out signal AR into a digital signal to generate the EFM signal E to the edge detection circuit 1, and also extracts the pit clock signal PC of the period T to supply the pit clock signal PC to the PLL circuit 9. The clock generator 8 generates the clock CK having the period T/2 and supplies the clock CK to the edge detection circuit 1, the pattern width detectors 2 and 3, and the frame generation circuit 7. The edge detection circuit 1 detects the rising edge and the falling edge of the EFM signal E in synchronism with the clock CK to generate the rising edge detection signal REG and the failing edge detection signal FEG to the pattern width detectors 2 and 3, respectively.

The pattern width detector 2 measures the interval between each pair of continuous rising edge detection signals REG by counting the clock CK, and compares the maximum interval of the measured intervals, namely, the pattern width of the maximum pattern width signal, with the synchronous pattern width 22T corresponding to the normal rotation linear velocity. As the result of this comparison, if the maximum pattern width is larger than 22T, since the disk rotates at a velocity slower than the normal rotation linear velocity, the pattern width detector 2 generates the positive rotation signal RFF for disk acceleration. To the contrary, if the maximum pattern width is smaller than 22T, since the disk rotates at a velocity faster than the normal rotation linear velocity, the pattern width detector 2 generates the negative rotation signal RRW for the disk deceleration. Similarly, the pattern width detector 3 measures the interval of the continuous falling edge detection signals FEG, and selectively generates either the positive rotation signal FFF or the negative rotation signal FRW.

The detection result synthesis circuit 4 synthesizes the respective detection results outputted from the pattern width detectors 2 and 3. Since both of the positive rotation signal RFF outputted from the pattern width detector 2 and the positive rotation signal FFF outputted from the pattern width detector 3 are a signal for accelerating the rotation of the disk 10, the detection result synthesis circuit 4 synthesizes both the positive rotation signals RFF and FFF to generate the positive rotation signal FF. Similarly, the detection result synthesis circuit 4 synthesizes both the negative rotation signals RRW and FRW to generate the negative rotation signal RW.

At the time of starting the disk rotation, or at the track jump, the pattern widths of both the positive and negative maximum pattern width signals become greatly different from each other, and the appearance frequency of these maximum pattern widths changes. Under this circumstance, the peak/bottom hold circuit 5 latches and holds the positive rotation signal FF and the negative rotation signal RW for the constant peak sampling period TS, to output the corresponding positive and negative motor drive signals MDF and MDR, respectively. The length of the peak sampling period TS, is set by frequency-dividing the frame signal FCK supplied from the frame generation circuit 7, to 1/N, by action of the frequency division circuit 6. Since the synchronous pattern exists repeatedly at least at every one frame, namely, at every 588T, the positive and negative maximum pattern width signals necessarily exists during the peak sampling period TS obtained by frequency-dividing the frame signal FCK to 1/N.

The frame generation circuit 7 responds to the pit clock PCLK supplied from the PLL circuit 9 or the clock CK supplied from the clock generation circuit 8, to generate the frame signal FCK indicative of one frame.

In addition, the peak/bottom hold circuit 5 extracts, from the maximum pattern width signals detected during the peak sampling periods, the maximum pattern width signal having a minimum pattern width during a bottom period which is longer than the peak sampling period. This is to eliminate a signal of a large pattern width generated due to a scratch on the disk 10, thereby to minimize an erroneous detection of the maximum pattern width signal.

The output circuit 12 responds to the motor drive signals MDF and MDR supplied from the peak/bottom hold circuit 5, to output the motor drive output signal MD so as to drive a spindle motor (not shown) for rotating the disk 10.

Next, the shown embodiment will be described in detail.

Figure 6:
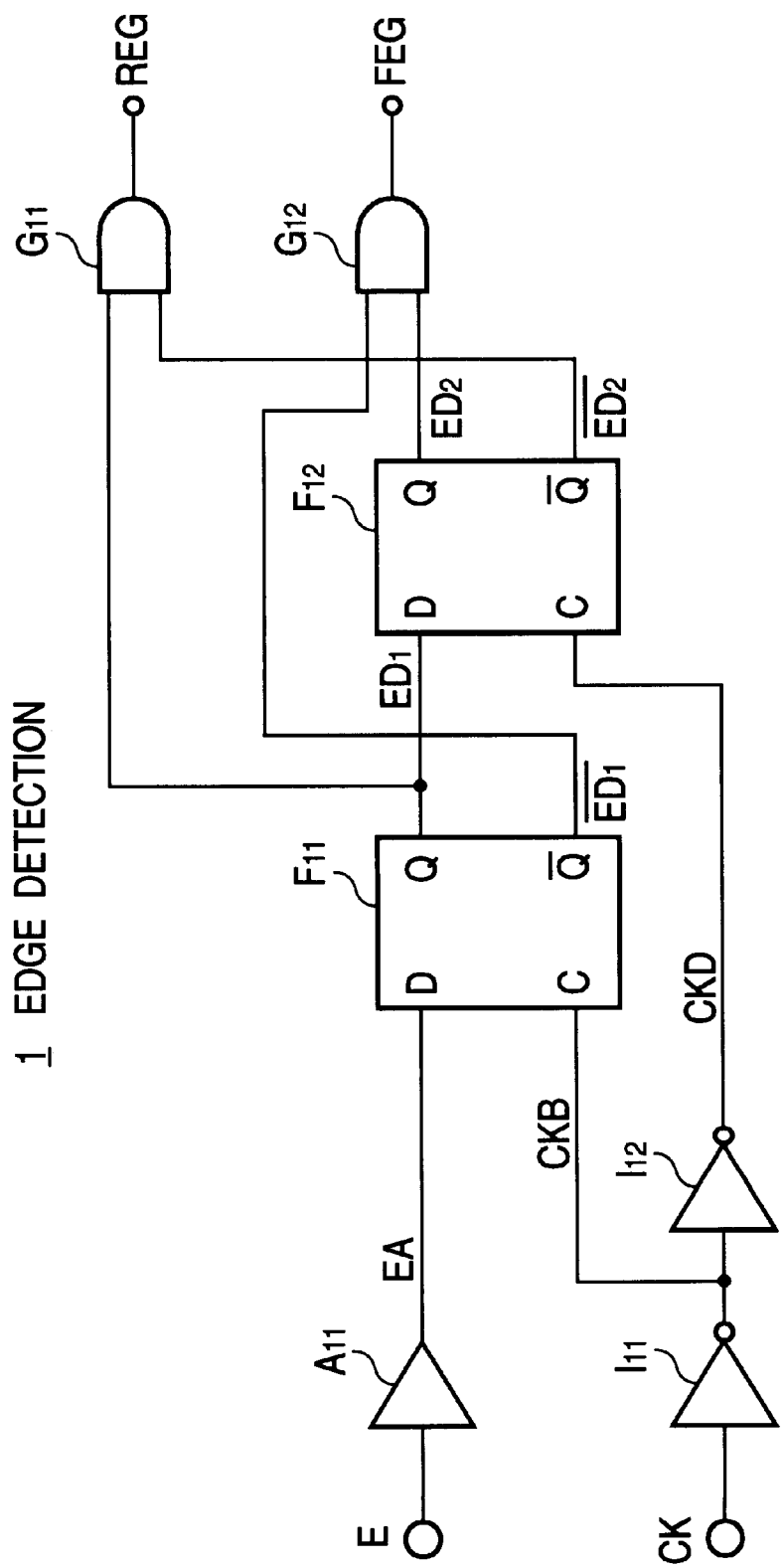
FIG. 6 is a circuit diagram of the edge detection circuit used in the disk rotational velocity controlling circuit shown in FIG. 5.

Referring to FIG. 6, there is a circuit diagram of the edge detection circuit 1. The edge detection circuit 1 shown in FIG. 6 includes a buffer amplifier A11 receiving and amplifying the EFM signal E to generate an amplified signal EA, cascaded inverters I11 and I12 receiving the clock CK to generate an inverted delayed clock CKB and a non-inverted further delayed clock CKD, respectively, a D-type flipflop F11 receiving the signal EA and controlled by the inverted delayed clock CKB, to output a signal ED1 delayed from the signal EA by one clock and an inverted signal $\overline{ED1}$ of the signal ED1, another D-type flipflop F12 receiving the signal ED1 and controlled by the non-inverted further delayed clock CKD, to output a signal ED2 delayed from the signal ED1 by one clock and an inverted signal $\overline{ED2}$ of the signal FD2, an AND gate G11 receiving the signals ED1 and ED2 to generate the rising edge detection signal REG constituted of a logical AND between the signals ED1 and ED2, and another AND gate G12 receiving the signals ED1 and ED2 to generate the falling edge detection signal FEG constituted of a logical AND between the signals $\overline{ED1}$ and ED2.

Now, an operation of this edge detection circuit 1 will be described. If the EFM signal E is supplied to the buffer amplifier A11, the buffer amplifier A11 outputs the amplified EFM signal EA. The D-type flipflop F11 outputs the signal ED1 and its inverted signal $\overline{ED1}$, which are delayed from the signal EA by one clock and in synchronism with the delayed clock CKB. These signals ED1 and $\overline{ED1}$ are supplied to the D-type flipflop F12 and the AND gates G11 and G12. The D-type flipflop F12 outputs the signal ED2 and its inverted signal $\overline{ED2}$, which are delayed from the signal ED1 by one clock and in synchronism with the delayed clock CKD in opposite phase to the delayed clock CKB, and therefore, which are actually delayed from the signal ED1 by a half of the period of the clock (namely, T/4). The signals ED2 and $\overline{ED2}$ are supplied to the AND gates G11 and G12.

The AND gate G11 receives the signals ED1 and $\overline{ED2}$ to execute a logical AND operation between the signals ED1 and $\overline{ED2}$, thereby to detect a rising edge, namely, a rising level transition, of the EFM signal, and to generate the rising edge detection signal REG having the width which is a half of the period of the clock (namely, T/4). The AND gate G12 receives the signals $\overline{ED1}$ and ED2 to execute a logical AND operation between the signals $\overline{ED1}$ and ED2, thereby to detect a falling edge, namely, a falling level transition, of the EFM signal, and to generate the falling edge detection signal FEG having the width which is a half of the period of the clock (namely, T/4).

Figure 7:
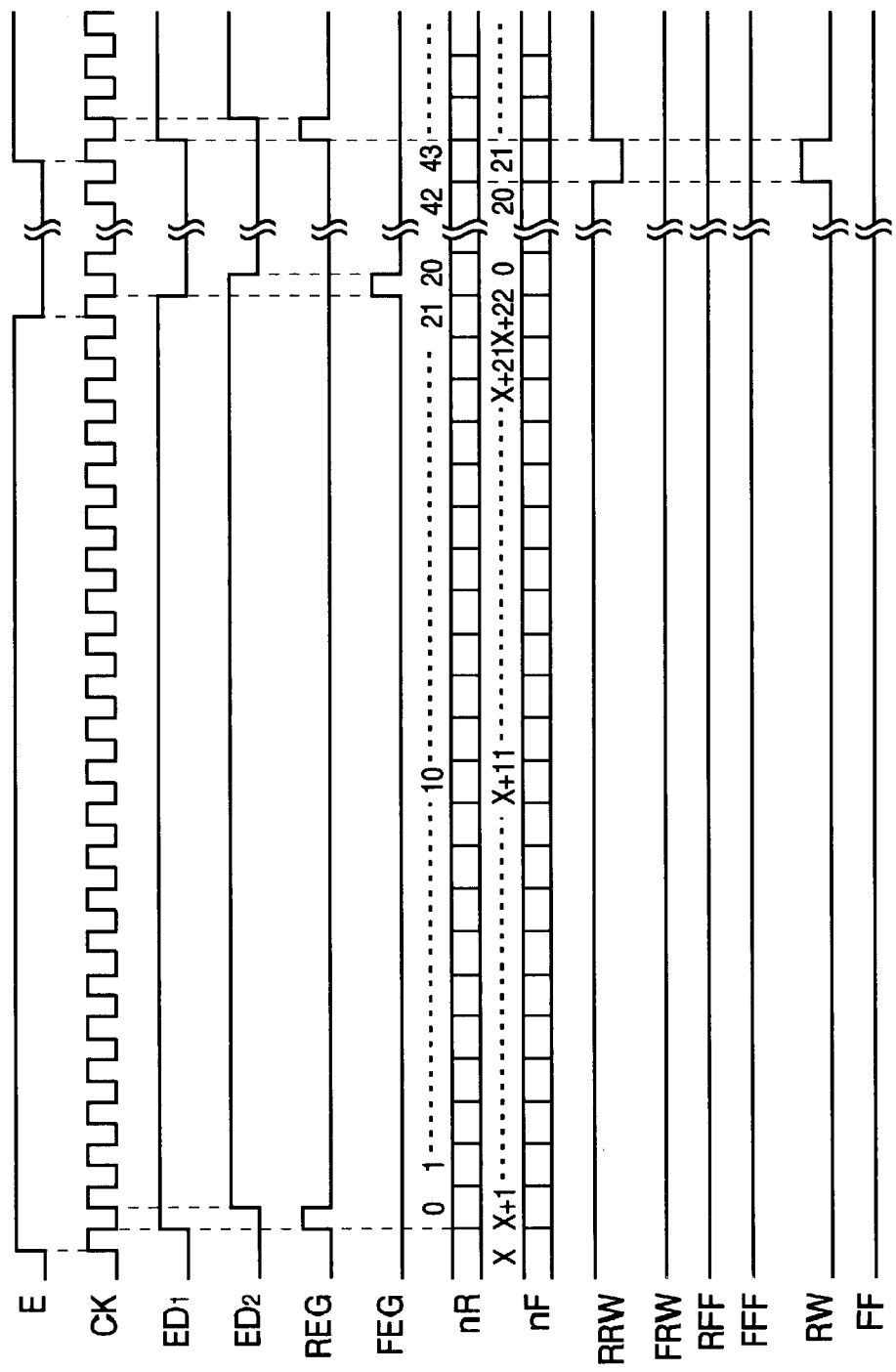
FIG. 7 is a timing chart illustrating one example of the operation of the first embodiment of the disk rotational velocity controlling circuit in accordance with the present invention, at the time of a normal operation.

Referring to FIG. 7, there is shown a timing chart illustrating one example of the operation waveform corresponding to one frame in a first case that the disk rotates at a normal linear velocity. As shown in FIG. 7, the EFM signal E is generated in the form of a combination of the high level having the width 11T and the low level having the width 11T. The signal ED1 is generated at the falling edge of a first clock appearing after the EFM signal E has risen, and the signal ED2 is generated at the rising edge of a second clock appearing after the EFM signal E has risen. The signal REG is generated to have the width starting at the rising edge of the signal ED1 and terminating at the rising edge of the signal ED2, and the signal FEG is generated to have the width starting at the falling edge of the signal ED1 and terminating at the falling edge of the signal ED2.

The pattern width detectors 2 and 3 have the same construction, and therefore, the construction of only the pattern width detector 2 will be described with reference to FIG. 8, which is a circuit diagram of the pattern width detector 2 used in the disk rotational velocity controlling circuit shown in FIG. 5.

The pattern width detector 2 as shown in FIG. 8 comprises a counter 21 reset in response to the rising edge detection signal REG and counting the clock CK to output a count value nR, and a pair of decoders 22 and 23 coupled to the counter 21 and generating the signal RRW and the signal RFF when the count value reaches "43" and "44", respectively. The counter 21 is configured to count up to a value of 22×2+α.

Incidentally, in the preceding and succeeding descriptions, the pattern width detector 3 can be understood by changing the Reference Numerals to numbers on the order of 30 and also changing the signals REG, RRW and RFF to FEG, FRW and OFF, respectively and the count value nR to the count value nF, as shown by parenthesized Reference Numerals and Signs in FIG. 8.

As mentioned above, the counter 21 can count up to the value of 22×2+α, for the purpose of determining the synchronous pattern width 22T by counting the clock CK having the period of T/2. There, +α is a tolerance or margin for ensuring to be able to detect the synchronous pattern width which is larger than 22T when the disk rotation linear velocity is slower than the normal linear velocity.

Now, an operation of the pattern width detector 2 will be described. The counter 21 is reset in response to the rising edge detection signal REG and thereafter starts to count the clock CK. The counter 21 is reset again in response to the next rising edge detection signal REG, but just before the counter 21 is reset, the count value nR of the counter 21 is supplied to the decoders 22 and 23. The decoder 22 generates the negative rotation signal RRW when the received count value nR reaches 43 (=22×2−1) or less. Similarly, the decoder 23 generates the positive rotation signal RFF when the received count value nR reaches 44 (=22×2) or more.

Figure 9:
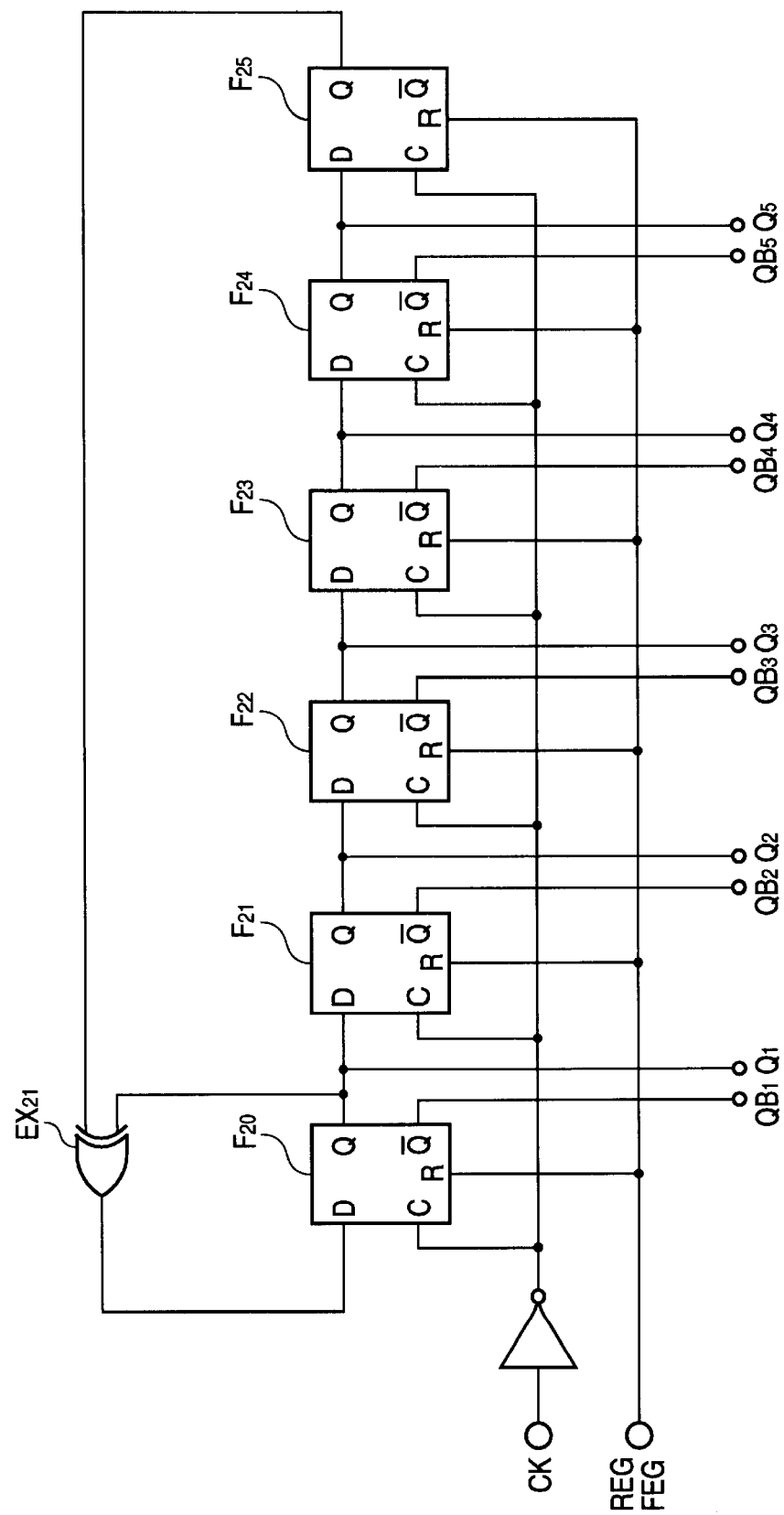

Referring to FIG. 9, there is shown a circuit diagram of the counter 21. The shown counter 21 comprises six cascaded stages of D-type flipflops F20 to F25 connected as shown, and an exclusive OR circuit EX21 receiving a Q output of each of the flipflops F20 and F25, and having an output connected to a D input of the flipflop F20.

The counter 21 constitutes a maximum length sequence code generator generating a maximum length sequence random number and having a period of $(2^n-1)$. In the shown example, since the counter 21 is constituted of six stages of flipflops F20 to F25 (n=6), the counter 21 can count to 63. The flipflops F20 to F25 constitutes the shift register, and the count value is incremented in response to each clock CK and is reset in response to the edge detection signal REG. As mentioned above, the D input of the flipflop F20 is supplied with the output of the exclusive OR circuit EX2 1. With this arrangement, since a binary sequence is fed back, the counter 21 generates a random number with the period of "63", and also functions as a synchronous counter.

Returning to the timing chart of FIG. 7, the count values nR and nF change at random, however, for convenience of description, after it is reset, the count value nR changes as 0 (zero), • • • , 22, • • • , 43, and changes as 0 (zero), • • • again after it is reset. After it is reset, the count value nF changes as an arbitrary number "X", • • • , X+22, 0 (zero), • • • , 21, and changes as "X", • • • again after it is reset. This arbitrary number "X" will be described hereinafter.

First, if the rising edge detection signal REG of the high level is supplied, the count value nR of the counter 21 is reset, and the counter 21 counts the clock CK to increment the count value until the next rising edge detection signal REG is supplied. Similarly, the count value nF of the counter 31 is reset in response to the falling edge detection signal FEG, and the counter 31 counts the clock CK to increment the count value until the next falling edge detection signal FEG is supplied. Since the example shown in FIG. 7 shows the normal linear velocity, the count value nR increments to 43, and thereafter, is reset to 0 (zero). Since the count value nR at this time is brought to 0 (zero) because of the reset input, the count value "43" of the synchronous pattern width actually indicates the pattern width of 44, namely, the normal linear velocity. Similarly, the count value nF of "44" actually indicates the pattern width of 45, namely, a velocity slower than the normal linear velocity.

Referring to FIG. 10 showing a circuit diagram of the decoders 22, 23, 32 and 33 and the detection result synthesis circuit 4, the decoder 22 includes two three-input AND circuits G221 and G222, and a two-input NAND circuit G223 receiving an output of the AND circuits G221 and G222. The decoder 23 includes two three-input AND circuits G231 and G232, and a two-input NAND circuit 0233 receiving all output of the AND circuits G231 and G232. The decoder 32 includes two three-input AND circuits G321 and G322, and a two-input NAND circuit G323 receiving an output of the AND circuits G321 and G322. The decoder 33 includes two three-input AND circuits G331 and G332, and a two-input NAND circuit G333 receiving an output of the AND circuits G331 and G332.

The detection result synthesis circuit 4 includes a NAND circuit G41 receiving the signals RRW and FRW outputted from the NAND circuit G223 and the NAND circuit G323, respectively, to execute a NAND logic operation so as to generate the signal RW, and another NAND circuit G42 receiving the signals RFF and FFF outputted from the NAND circuit G233 and the NAND circuit G333, respectively, to execute a NAND logic operation so as to generate the signal FF.

The AND circuits G221 and G222 of the decoder 22 are connected to receive outputs QB0, Q1 and QB2, and Q3, Q4 and QB5 of the flipflops F20 to F25, as shown in FIG. 10, in order to decode "43", namely, a 44th condition of the counter 21. The AND circuits G231 and G232 of the decoder 23 are connected to receive outputs Q0, QB1 and Q2, and QB3, Q4 and Q5 of the flipflops F20 to F25, as shown in FIG. 10, in order to decode "44", namely, a 45th condition of the counter 21.

With this arrangement, only when all the inputs of the AND circuits G221 and G222 are at a high level, namely, only when the counter 21 assumes the 44th condition, each of the AND circuits G221 and G222 outputs a high level, so that the NAND gate G223 outputs the negative rotation signal RRW of the low level. Similarly, only when all the inputs of the AND circuits G231 and G232 are at a high level, namely, only when the counter 21 assumes the 45th condition, each of the AND circuits G231 and G232 outputs a high level, so that the NAND gate G233 outputs the positive rotation signal FRW of the low level.

Similarly, the AND circuits G321 and G322 of the decoder 32 are connected to receive outputs QB0, Q1 and QB2, and Q3, Q4 and QB5 of the flipflops F20 to F25, and the AND circuits G331 and G332 of the decoder 33 are connected to receive outputs Q0, QB1 and Q2, and QB3, Q4 and Q5 of the flipflops F20 to F25, as shown in FIG. 10. Only when all the inputs of the decoder 32 are at a high level, the decoder 32 outputs the negative rotation signal FRW of the low level. Only when all the inputs of the decoder 33 are at a high level, the decoder 33 outputs the positive rotation signal FFF of the low level.

With the above mentioned operation, the rising edge maximum pattern width and the falling edge maximum pattern width are measured, decoded and detected, separately from each other. Therefore, it is necessary to synthesize the detected rising edge maximum pattern width and the detected falling edge maximum pattern width.

For this purpose, the detection result synthesis circuit 4 generates the negative rotation signal RW by synthesizing the signals RRW and FRW indicative of the detection of the respective 44th conditions of the counters 21 and 31 (count value 43). Furthermore, the detection result synthesis circuit 4 generates the positive rotation signal FF by synthesizing the signals RFF and FFF indicative of the detection of the respective 45th conditions of the counters 21 and 31 (count value 44). Namely, the NAND circuit G41 receives the signals RRW and FRW and generates the negative rotation signal RW of the high level if at least one of the signals RRW and FRW is at the low level. Similarly, the NAND circuit G42 receives the signals RFF and FFF and generates the positive rotation signal FF of the high level if at least one of the signals RFF and FFF is at the low level.

Here, the arbitrary number "X" of nF in FIG. 7 is in the range from a minimum value corresponding to the minimum number 3T in the EFM format to a maximum value corresponding to the maximum number 10T in the EFM format, namely, in the range between the minimum value 5 (=3×2−1) and the maximum value 19 (=10×2−1). Therefore, even if the maximum value "X+22" becomes equal to 41, neither the decoder 32 nor 33 can generate the detection signal, so that neither the signal FRW nor FFF is generated.

Now, referring to FIG. 11, there is shown a timing chart illustrating a second case of the operation waveform corresponding to one frame, in the first embodiment of the disk rotational velocity controlling circuit in accordance with the present invention when the disk rotates at a normal linear velocity. In this second case, the EFM signal E is generated in the form of a combination of the low level having the width 11T and the high level having the width 11T, which is opposite in phase to that of the first case shown in FIG. 7. Therefore, the falling edge is detected at the first place, and the failing edge detection signal FEG is generated. In response to this falling edge detection signal FEG, the counter 31 is reset to start the counting from "0" and to output the count value AF. On the other hand, at this time, the counter 21 increments the count value nR as the arbitrary number "X", "X+1", • • • to continue to count up until the counter 21 is reset by the rising edge detection signal REG. However, since the "X" is in the range of 5 to 19, neither the signal RRW nor RFF is generated. Therefore, in this case, the control is carried out on the basis of the signals FRW and FFF.

Next, referring to FIG. 12, there is shown a timing chart illustrating one example of the operation waveform corresponding to one frame, in the first embodiment of the disk rotational velocity controlling circuit in accordance with the present invention, when the disk rotational velocity is faster than the normal rotation linear velocity. In this example, the EFM signal E is generated in the form of a combination of the high level having the width 11T and the low level having the width 10.5T. Therefore, similar to the first case shown in FIG. 7, the rising edge is detected at the first place, and the rising edge detection signal REG is generated so that the counter 21 is reset to count up the count value nR from 0 (zero). However, at the same time as the count value nR reaches 43, the rising edge detection signal REG is generated to reset the counter 21. Therefore, neither the decoder 22 nor 23 changes its output, so that either the signal RRW or RFF does not change. Namely, either the signal RW or FF does not change.

Incidentally, this condition similarly occurs in the case that the EFM signal E is opposite in phase to the above case, namely when the EFM signal E is generated in the form of a combination of the low level having the width 11T and the high level having the width 10.5T, and in another case that the EFM signal E is generated in the form of a combination of the high level having the width 10T and the low level having the width 10T, which are shorter that those of the above case. In other words, when the synchronous pattern is shorter than 22T, either the signal RW or FF does not change.

Furthermore, referring to FIG. 13, there is shown a timing chart illustrating one example of the operation waveform corresponding to one frame, in the first embodiment of the disk rotational velocity controlling circuit in accordance with the present invention, when the rotational velocity is slower than the normal rotational velocity. In this example, the EFM signal E is generated in the form of a combination of the high level having the width 11T and the low level having the width 11.5T. Therefore, similar to the first case shown in FIG. 7, the rising edge is detected at the first place, and the rising edge detection signal REG is generated so that the counter 21 is reset to count up the count value nR from 0 (zero). When the count value nR reaches 43, the decoder 22 generates the negative rotation signal RRW, so that the signal RW is brought to the high level. Since the rising edge detection signal REG is not generated at this time, the counter 21 counting up in response to the clock CK has not yet been reset, and therefore, increments the count value nR to "44". In response to this count value nR of "44", the decoder 23 brings the positive rotation signal RFF of the low level, so that the positive rotation signal FF is brought to the high level.

Incidentally, this condition similarly occurs in the case that the EFM signal E is opposite in phase to the above case, namely when the EFM signal E is generated in the form of a combination of the low level having the width 11T and the high level having the width 12T, and in another case that the EFM signal E is generated in the form of a combination of the high level having the width 12T and the low level having the width 12T, which are longer that those of the above case. In other words, when the synchronous pattern is longer than 22T, both the signals RW and FF are resultantly brought to the high level, since either the signal FRW or FFF changes dependently upon which is the phase of the synchronous pattern, positive or negative.

As seen from the above, it can be discriminated as follows: When only the negative rotation signal RW is brought to the high level, the disk rotates at the normal linear velocity. When both the negative rotation signal RW and the positive rotation signal FF are maintained at the low level, the disk rotates at a velocity higher than the normal linear velocity. On the other hand, when both the negative rotation signal RW and the positive rotation signal FF are brought to the high level, the disk rotates at a velocity lower than the normal linear velocity.

The negative rotation signal RW and the positive rotation signal FF are supplied to the peak/bottom hold circuit 5, so that the peak/bottom hold circuit 5 performs a peak/bottom processing for the negative rotation signal RW and the positive rotation signal FF, to generate the motor drive signal MDF or MDR to the output circuit 12.

When the disk rotates at the normal linear velocity, the positive rotation signal FF is maintained at the low level, and the motor drive signal MDF is maintained at the low level. In the output circuit 12, therefore, the inverter I12 receiving the motor drive signal MDF of the low level, outputs a high level, so that the PMOS transistor M21 is maintained in an off condition. On the other hand, since the negative rotation signal RW is at the high level, the motor drive signal MDR is also brought to the high level. The inverter I22 receiving the motor drive signal MDF of the high level, outputs a low level, so that the NMOS transistor M22 is maintained in an off condition. As a result, the output signal MD is in a high impedance condition, or at an intermediate potential, so that the spindle motor for driving the disk maintains its rotational velocity.

When the disk rotates at a velocity higher than the normal linear velocity, the positive rotation signal FF is maintained at the low level, and therefore, the motor drive signal MDF is maintained at the low level.

The inverter I12 receiving the motor drive signal MDF of the low level, outputs a high level, so that the PMOS transistor M21 is maintained in an off condition. On the other hand, since the negative rotation signal RW is also maintained at the low level, the motor drive signal MDR is maintained at the low level. The inverter I22 receiving the motor drive signal MDF of the low level, outputs a high level, so that the NMOS transistor M22 is brought into an on condition. As a result, the output signal MD is brought to the ground potential or a negative potential which is the same as the potential of the source of the NMOS transistor M22, so that the rotational velocity of the spindle motor is decelerated.

When the disk rotates at a velocity lower than the normal linear velocity, the positive rotation signal FF is brought to the high level, and therefore, the motor drive signal MDF is brought to the high level. The inverter I12 receiving the motor drive signal MDF of the high level, outputs a low level, so that the PMOS transistor M21 is brought into an on condition. On the other hand, since the negative rotation signal RW is also brought to the high level, the motor drive signal MDR is brought to the high level. The inverter I22 receiving the motor drive signal MDF of the high level, outputs a low level, so that the NMOS transistor M22 is brought into an off condition. As a result, the output signal MD is brought to the positive potential which is the same as the potential of the source of the PMOS transistor M21, so that the rotational velocity of the spindle motor is accelerated.

As seen from the above, since the shown embodiment is configured to detect the synchronous pattern read out from the disk, not as the pulses of 11T+11T, but as one signal having the width of 22T, it is possible to more precisely detect the linear velocity of the disk rotation.

For example, when the signal pattern width 9T is read out as 12T because of a scratch or the like on the disk, it was detected as the maximum pattern width in the prior art example, but in the shown embodiment configured to detect the rising edge interval and the falling edge interval independently of each other, if the pattern width is not greater than 10T, the rising edge interval and the falling edge interval do not reach 22T, the signal pattern width 9T erroneously read out as 12T because of a scratch or the like on the disk, is never detected as the maximum pattern width. In other words, the maximum pattern width detection will not to be influenced by an accidental pattern width change caused by the scratch or a like on the disk.

Furthermore, when the internal clock frequency is elevated in order to improve the detection precision, it is possible to enlarge the operation margin in an internal circuit. In addition, even when necessary pit clocks cannot be obtained from the EFM signal at the disk starting time or at the track jump, it is possible to maintain the linear velocity of the disk rotation at the normal linear velocity.

Moreover, with the elevated velocity detection precision, it is possible to narrow the draw-in range. For example, the draw-in range can be improved to ±2.25% of the normal linear velocity from ±4.5% of the normal linear velocity which was adopted in the prior art example.

In addition, since the detection precision of the disk rotation linear velocity is improved, it is possible to shorten the draw-in time of drawing to the normal linear velocity, and therefore, to elevate the access speed to the disk. Specifically, when the pickup movement is one third of a full movement range, namely, at a one-third stroke, the access speed was 400 ms in the prior art example, but can be shortened to 100 ms in the shown embodiment.

Still further, since a load on the PLL circuit can be reduced, even if the clock frequency is the same as the prior art, the precision can be elevated, and therefore, the operation margin can be increased.

The invention has thus been shown and described with reference to the specific embodiment. However, it should be noted that the present invention is in no way limited to the details of the specific embodiment as described above but changes and modifications may be made within the spirit of the present invention. It is a matter of course that, for example. the present invention can be applied to not only the CD player, but also other information reproducing apparatus by changing the decode number of the counter in accordance with the difference in parameters such as the synchronous pattern width.

Here, the frequency "f" of the clock CK for driving the counter used to detect the maximum width of the synchronous pattern and the decode value "N" can be freely changed if the following relation is fulfilled in the case of detecting the linear velocity of the disk rotation:

$(1/f) \times N = 22T$ where T is the period of the pit clock.

Now, an edge detection circuit 1A, which is incorporated in a second embodiment of the disk rotational velocity controlling circuit in accordance with the present invention, will be described with reference to FIG. 14, which is a circuit diagram of the edge detection circuit 1A. In FIG. 14, elements corresponding to those shown FIG. 6 are given the same Reference Numerals, and explanation thereof will be omitted for simplification of description.

As seen from comparison between FIGS. 6 and 14, the edge detection circuit 1A is different from the edge detection circuit 1A, in that the buffer amplifier A11 is omitted so that the EFM signal E is supplied directly to the D-type flipflop F11, and the AND circuits G11 and G12 are replaced by a NOR circuit G13 receiving the signals $\overline{ED1}$ and ED2 of the flipflops F11 and F12 to generate the rising edge detection signal REG constituted of a logical NOR between the signals $\overline{ED1}$ and ED2, and another NOR circuit G14 receiving the output signals ED1 and $\overline{ED2}$ of the flipflops F11 and F12 to generate the falling edge detection signal FEG constituted of a logical NOR between the signals ED1 and $\overline{ED2}$.

The second embodiment of the disk rotational velocity controlling circuit in accordance with the present invention is the same as the first embodiment of the disk rotational velocity controlling circuit in accordance with the present invention, excluding the edge detection circuit 1A.

Now, an operation of the edge detection circuit 1A will be described. If the EFM signal E is supplied to the D-type flipflop F11, the D-type flipflop F11 outputs the signal ED1 and its inverted signal $\overline{ED1}$, which are delayed from the signal EA by one clock and in synchronism with the delayed clock CKB. These signals ED1 and $\overline{ED1}$ are supplied to the D-type flipflop F12 and the NOR gates G13 and G14. The D-type flipflop F12 outputs the signal ED2 and its inverted signal $\overline{ED2}$, which are synchronized with the delayed clock CKD in opposite phase to the delayed clock CKB, and which are delayed from the signal ED1 by a half of the period of the clock (namely, T/4). The signals ED2 and $\overline{ED2}$ are supplied to the NOR gates G13 and G14. The NOR gates G13 executes a logical NOR operation between the signals $\overline{ED1}$ and ED2, to detect a rising edge of the EFM signal E and to generate the rising edge detection signal REG. The NOR gate G14 executes a logical NOR operation between the signals ED1 and $\overline{ED2}$, to detect a falling edge of the EFM signal E and to generate the falling edge detection signal FEG.

The edge detection circuit 1A is advantageous over the edge detection circuit 1, because the number of required transistors can be reduced in comparison with the edge detection circuit 1.

Now, a counter 21A and decoders 22A, 23A, 32A and 33A, which are included in each of pattern width detectors 2A and 3A incorporated in a third embodiment of the disk rotational velocity controlling circuit in accordance with the present invention, will be described with reference to FIGS. 15 and 16. FIG. 15 is a circuit diagram of the counter 21A, which represents for both the counter 21A of the pattern width detector 2A and the counter 31A of the pattern width detector 3A, and FIG. 16 is a circuit diagram of the decoders 22A, 23A, 32A and 33A. In FIGS. 15 and 16, elements corresponding to those shown FIGS. 9 and 10 are given the same Reference Numerals, and explanation thereof will be omitted for simplification of description.

As seen from comparison between FIGS. 15 and 16 and FIGS. 9 and 10, the pattern width detector 2A is different from the pattern width detector 2, in that the counter 21A (31A) is constituted of a ring counter composed of a 24-stage shift register consisting of flipflops F1 to F24 cascaded in the form of a ring, and in that the decoder 22A is constituted of a NAND circuit receiving a $\overline{Q}$ output signal $\overline{Q19}$ of the flipflop F19 in the counter 21A and a Q output signal Q20 of the flipflop F20 in the counter 21A to output a NAND logic as the negative rotation signal RRW, the decoder 23A is constituted of a NAND circuit receiving a $\overline{Q}$ output signal $\overline{Q20}$ of the flipflop F20 and a Q output signal Q21 of the flipflop F21 in the counter 21A to output a NAND logic as the positive rotation signal RFF, the decoder 32A is constituted of a NAND circuit receiving a $\overline{Q}$ output signal $\overline{Q19}$ of the flipflop F19 in the counter 31A and a Q output signal Q20 of the flipflop F20 in the counter 31A to output a NAND logic as the negative rotation signal FRW, the decoder 23A is constituted of a NAND circuit receiving a $\overline{Q}$ output signal $\overline{Q20}$ of the flipflop F20 and a Q output signal Q21 of the flipflop F21 in the counter 31A to output a NAND logic as the positive rotation signal FFF.

More specifically, the counter 21A is constituted of a ring counter consisting of flipflops F1 to F24 which are cascaded in such a manner that a Q output of the first stage flipflop F1 is connected to a D input of the second stage flipflop F2, a Q output of the second stage flipflop F2 is connected to a D input of the third stage flipflop F3, and so on, and a Q output of the final stage flipflop F24 is connected to a D input of the first stage flipflop F1. All the flipflops F1 to F24 are reset by the rising edge detection signal REG (or the falling edge detection signal PEG in the counter 31A) and are driven by the clock CK to perform a shift operation.

Now, an operation will be described. Each of the flipflops F1 to F24 included in the counter 21A transfers data to a next stage flipflop in the order in response to each clock and with a delay corresponding to one clock. The period of the counter 21A is 24×2, and therefore, the counter 21A can count to 47. Therefore, the counter 21A counts up in response to the clock CK, and is reset in response to the rising edge detection signal REG. Therefore, the counter 21A operates substantially similarly to the counter of the first embodiment. However, since the output condition of the count value is different from the counter of the first embodiment, the decoders 22A and 23A for generating the positive and negative rotation signals on the basis of the different output condition of the counter, are different in construction from those in the first embodiment.

Similarly to the first embodiment, the decoders 22A and 23A decode and detect the count value "43" and "44" of the counter 21A, respectively, which corresponds to the 44th condition and the 45th condition of the counter 21A, respectively. In the 44th condition of the counter 21A, namely, when the count value is "43" counted from "0" (zero), both the $\overline{Q}$ output signal $\overline{Q19}$ of the flipflop F19 and the Q output signal Q20 of the flipflop F20 are at the high level. Since this condition cannot exist in the count values other than "43", the decoder 22A is constituted of the NAND circuit receiving the $\overline{Q}$ output signal $\overline{Q19}$ of the flipflop F19 and the Q output signal Q20 of the flipflop F20. Similarly, the decoder 23A is constituted of the NAND circuit receiving the $\overline{Q}$ output signal $\overline{Q20}$ of the flipflop F20 and the Q output signal Q21 of the flipflop F21, both of which assume the high level when the counter 21A assumes the count value "44".

As seen from the above, the pattern width detector 2A is characterized in that, although the number of circuit elements included in the counter increases, the architecture of the counter is simple, and on the other hand, the number of circuit elements included in the decoder is greatly reduced.

Now, a counter 21B and decoders 22B, 23B, 32B and 33B, which are included in each of pattern width detectors 2B and 313 incorporated in a fourth embodiment of the disk rotational velocity controlling circuit in accordance with the present invention, will be described with reference to FIGS. 17 and 18. FIG. 17 is a circuit diagram of the counter 21B, which represents for both the counter 21B of the pattern width detector 2B and the counter 31B of the pattern width detector 3B, and FIG. 18 is a circuit diagram of the decoders 22B, 23B, 32B and 33B. In FIGS. 17 and 18, elements corresponding to those shown FIGS. 9 and 10 are given the same Reference Numerals, and explanation thereof will be omitted for simplification of description.

As seen from comparison between FIGS. 17 and 18 and FIGS. 9 and 10, the pattern width detector 2B is different from the pattern width detector 2, in that the counter 21B (31B) is constituted of a synchronous binary counter composed of 6 flipflops F31 to F36 connected as shown and configured to be reset by the rising edge detection signal REG and to count up "63" in response to the clock CK, and in that the decoder 22B is constituted of a pair of AND gates receiving respective Q output signals Q6, Q4, Q2, and Q1 of the flipflops F36, F34, F32 and F31, and respective $\overline{Q}$ output signals $\overline{Q5}$ and $\overline{Q3}$ of the flipflops F33 and F33, for the purpose of decoding and detecting the binary number "101011" corresponding to the count value "43", and a NAND circuit receiving an output of these AND gates to generate the negative rotation signal RRW, and the decoder 23B is constituted of a pair of AND gates receiving respective Q output signals Q6, Q4 and Q3 of the flipflops F36, F34 and F33, and respective $\overline{Q}$ output signals $\overline{Q5}$, $\overline{Q2}$ and $\overline{Q1}$ of the flipflops F35, F32 and F31, for the purpose of decoding and detecting the binary number "101100" corresponding to the count value "44", and a NAND) circuit receiving an output of these AND gates to generate the positive rotation signal RFF. The decoder 32B is constituted similarly to the decoder 22B, and the decoder 33B is constituted similarly to the decoder 23B.

Since an operation of the counter 21B (31B) and the decoders 22B, 23B, 32B and 33B are apparent to persons skilled in the art from the respective circuit constructs, explanation thereof will be omitted.

As seen from the above, the disk rotational velocity controlling circuit in accordance with the present invention is so constructed that the edge detection circuit comprises the rising edge detector and the falling edge detector, and the synchronous pattern detection circuit including a first pattern width detector for measuring an interval between each pair of continuous rising edge detection signals to generate a rising edge pattern width signal, and to compare the rising edge pattern width signal with a normal synchronous pattern width so as to generate first and second rotational signals, a second pattern width detector for measuring an interval between each pair of continuous failing edge detection signals to generate a falling edge pattern width signal, and to compare the falling edge pattern width signal with a normal synchronous pattern width so as to generate third and fourth rotational signals, and a detection result synthesis circuit for synthesizing the first and third rotation signals to generate a positive rotation signal and fur synthesizing the second and fourth rotation signals to generate a negative rotation signal.

With this arrangement, since it is possible to detect the synchronous pattern read out from the disk, not as the pulses of 11T+11T, but as one signal having the width of 22T, it is possible to more precisely detect the linear velocity of the disk rotation.

In addition, since the detection precision of the disk rotation linear velocity is improved, it is possible to shorten the draw-in time of drawing to the normal linear velocity, and therefore, to elevate the access speed to the disk.

Furthermore, whether or not the disk rotation linear velocity is equal to, or slower or higher than the normal linear velocity, is discriminated. Therefore, it is possible to enlarge the detection range of disk rotation linear velocity.

I claim:

1. A disk rotational velocity controlling circuit for controlling a rotational velocity of a recording medium disk in which digital information at a predetermined signal format is recorded in a constant linear velocity, comprising a signal reproduction means receiving a read-out signal read out from said disk for converting said read-out signal into a reproduced signal of said predetermined signal format, characterized in that an edge detection circuit comprises a rising edge detecting means receiving said reproduced signal for detecting a rising edge of said reproduced signal to generate a rising edge detection signal, and a falling edge detecting means receiving said reproduced signal for detecting a falling edge of said reproduced signal, independently of said rising edge, to generate a falling edge detection signal, and a synchronous pattern detection circuit includes a first pattern width detector receiving said rising edge detection signal for measuring an interval between each pair of continuous rising edge detection signals to compare each measured rising edge interval with a normal synchronous pattern width so as to generate first and second rotational signals, a second pattern width detector receiving said falling edge detection signal for measuring an interval between each pair of continuous falling edge detection signals to compare each measured falling edge interval with said normal synchronous pattern width so as to generate third and fourth rotational signals, and a detection result synthesis circuit for synthesizing the first and third rotation signals to generate a positive rotation signal and for synthesizing the second and fourth rotation signals to generate a negative rotation signal.

2. A disk rotational velocity controlling circuit claimed in claim 1, wherein said first pattern width detector includes a first pattern width measuring means receiving said rising edge detection signal for measuring an interval between each pair of continuous rising edge detection signals to generate a first pattern width signal, and a first comparing means receiving said first pattern width signal, for comparing said first pattern width signal with a normal synchronous pattern width corresponding to a normal linear velocity of said disk, said first comparing means generating said first rotational signal when said first pattern width signal is larger than said normal synchronous pattern width, and said second rotational signal when said first pattern width signal is not larger than said normal synchronous pattern width;

wherein said second pattern width detector includes a second pattern width measuring means receiving said falling edge detection signal for measuring an interval between each pair of continuous falling edge detection signals to generate a second pattern width signal, and a second comparing means receiving said second pattern width signal, for comparing each second pattern width signal with said normal synchronous pattern width, said second comparing means generating said third rotational signal when said second pattern width signal is larger than said normal synchronous pattern width, and said fourth rotational signal when said second pattern width signal is not larger than said normal synchronous pattern width; and wherein said detection result synthesis circuit receives said first, second, third and fourth rotational signals, and synthesizes said first and third rotation signals to generate said positive rotation signal and synthesizes said second and fourth rotation signals to generate said negative rotation signal, and further comprising:

a peak/bottom hold circuit latching and holding said positive rotation signal and said negative rotation signal for a predetermined constant peak sampling period, to output the held positive rotation signal and the held negative rotation signal as a motor drive signal; and an output circuit receiving said motor drive signal to output a motor drive output signal.

3. A disk rotational velocity controlling circuit claimed in claim 1, wherein said edge detection circuit comprises:
- a buffer amplifier receiving said reproduced signal for outputting an amplified reproduced signal;
- a first inverter receiving a clock signal to generate an inverted clock signal;
- a second inverter receiving said inverted clock signal to generate a non-inverted clock signal;
- a first flipflop having a data input connected to receive said amplified reproduced signal and a clock input connected to receive said inverted clock signal, for generating a first non-inverted output signal and a first inverted output signal;
- a second flipflop having a data input connected to receive said first non-inverted output signal and a clock input connected to receive said non-inverted clock signal, for generating a second non-inverted output signal and a second inverted output signal;
- a first AND circuit receiving said first non-inverted output signal and said second inverted output signal, for generating said rising edge detection signal; and
- a second AND circuit receiving said first inverted output signal and said second non-inverted output signal, for generating said falling edge detection signal.

4. A disk rotational velocity controlling circuit claimed in claim 1, wherein said edge detection circuit comprises:
- a first inverter receiving a clock signal to generate an inverted clock signal;
- a second inverter receiving said inverted clock signal to generate a non-inverted clock signal;
- a first flipflop having a data input connected to receive said reproduced signal and a clock input connected to receive said inverted clock signal, for generating a first non-inverted output signal and a first inverted output signal;
- a second flipflop having a data input connected to receive said first non-inverted output signal and a clock input connected to receive said non-inverted clock signal, for generating a second non-inverted output signal and a second inverted output signal;
- a first NOR circuit receiving said first inverted output signal and said second non-inverted output signal, for generating said rising edge detection signal; and
- a second NOR circuit receiving said first non-inverted output signal and said second inverted output signal, for generating said falling edge detection signal.

5. A disk rotational velocity controlling circuit claimed in claim 2
- wherein said first pattern width measuring means is constituted of a first counter reset by said rising edge detection signal and counting a clock signal, so as to output a first count value as said first pattern width signal, and said second pattern width measuring means is constituted of a second counter reset by said falling edge detection signal and counting said clock signal so as to output a second count value as said second pattern width signal;
- wherein said first comparing means comprises a first decoder receiving said first count value to generate said first rotational signal when said first count value is consistent with a first reference value corresponding to said normal synchronous pattern width and a second decoder receiving said first count value to generate said second rotational signal when said first count value is consistent with a second reference value larger than said first reference value by one; and
- wherein said second comparing means comprises a third decoder receiving said second count value to generate said third rotational signal when said second count value is consistent with said first reference value and a third decoder receiving said second count value to generate said second rotational signal when said second count value is consistent with said second reference value.

6. A disk rotational velocity controlling circuit claimed in claim 5,
- wherein said first counter is constituted of first to (N)th flipflops reset by said rising edge detection signal and cascaded to transfer a data signal to a next stage within said first to (N)th flipflops in response to said clock, and an exclusive OR circuit receiving an output of each of said first flipflop and said (N)th flipflops and having an output connected to a data input of said first flipflop, said first to (N)th flipflops having a first group of N output bits and a second group of N output bits, which are selected to correspond to said first and second reference values, respectively, N being a positive integer;
- wherein said first decoder is constituted of a first logic circuit connected to said first group of N output bits to generate said first rotational signal when all bits included in said first group of N output bits assume a predetermined logical level, and said second decoder is constituted of a second logic circuit connected to said second group of N output bits to generate said second rotational signal when all bits included in said second group of N output bits assume said predetermined logical level;
- wherein said second counter is constituted of first to (N)th flipflops reset by said falling edge detection signal and cascaded to transfer a data signal to a next stage within said first to (N)th flipflops in response to said clock, and an exclusive OR circuit receiving an output of each of said first flipflop and said (N)th flipflops and having an output connected to a data input of said first flipflop, said first to (N)th flipflops having a third group of N output bits and a fourth group of N output bits, which are selected to correspond to said first and second reference values, respectively;
- wherein said third decoder is constituted of a third logic circuit connected to said third group of N output bits to generate said third rotational signal when all bits included in said third group of N output bits assume said predetermined logical level, and said fourth decoder is constituted of a fourth logic circuit connected to said fourth group of N output bits to generate said fourth rotational signal when all bits included in said fourth group of N output bits assume said predetermined logical level.

7. A disk rotational velocity controlling circuit claimed in claim 5,
- wherein said first counter is constituted of first to (M)th flipflops reset by said rising edge detection signal and cascaded to transfer a data signal to a next stage within said first to (M)th flipflops in response to said clock, an output of said (M)th flipflop being connected to an input of said first flipflops;
- wherein said first decoder is constituted of a first logic circuit connected to an inverted output of a (i)th flipflop of said first to (M)th flipflops and a non-inverted output of a (i+1)th flipflop to generate said first rotational signal when both said inverted output of said (i)th flipflop and said non-inverted output of said (i+1)th flipflop assume a predetermined logical level, where "i" is an integer substantially corresponding to said first reference value, and $1 \leq i \leq M$, said second decoder is constituted of a second logic circuit connected to an inverted output of said (i+1)th flipflop and a non-inverted output of a (i+2)th flipflop to generate said second rotational signal when both said inverted output of said (i+1)th flipflop and said non-inverted output of said (i+2)th flipflop assume said predetermined logical level;

wherein said second counter is constituted of first to (M)th flipflops reset by said falling edge detection signal and cascaded to transfer a data signal to a next stage within said first to (M)th flipflops in response to said clock, an output of said (M)th flipflop being connected to an input of said first flipflops;

wherein said third decoder is constituted of a third logic circuit connected to an inverted output of a (i)th flipflop of said first to (M)th flipflops and a non-inverted output of a (i+1)th flipflop to generate said third rotational signal when both said inverted output of said (i)th flipflop and said non-inverted output of said (i+1)th flipflop assume said predetermined logical level, and said fourth decoder is constituted of a fourth logic circuit connected to an inverted output of said (i+1)th flipflop and a non-inverted output of a (i+2)th flipflop to generate said fourth rotational signal when both said inverted output of said (i+1)th flipflop and said non-inverted output of said (i+2)th flipflop assume said predetermined logical level.

\* \* \* \* \*